United States Patent
Islam et al.

(10) Patent No.: US 12,149,314 B2
(45) Date of Patent: *Nov. 19, 2024

(54) USE OF UPLINK BEAM TRACKING RESULTS IN REFERENCE SYMBOL SESSIONS

(71) Applicant: QUALCOMM INCORPORATED, San Diego, CA (US)

(72) Inventors: Muhammad Nazmul Islam, Littleton, MA (US); Bilal Sadiq, Southlake, TX (US); Ashwin Sampath, Skillman, NJ (US); Sundar Subramanian, San Diego, CA (US); Junyi Li, Fairless Hills, PA (US); Vasanthan Raghavan, West Windsor Township, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/330,121

(22) Filed: Jun. 6, 2023

(65) Prior Publication Data
US 2023/0412221 A1 Dec. 21, 2023

Related U.S. Application Data

(63) Continuation of application No. 17/467,107, filed on Sep. 3, 2021, now Pat. No. 11,711,128, which is a
(Continued)

(51) Int. Cl.
*H04L 5/00* (2006.01)
*H04B 7/0456* (2017.01)
(Continued)

(52) U.S. Cl.
CPC ......... *H04B 7/0617* (2013.01); *H04B 7/0456* (2013.01); *H04B 7/0621* (2013.01);
(Continued)

(58) Field of Classification Search
CPC .. H04B 7/0456; H04B 7/0617; H04B 7/0621; H04B 7/0695; H04L 5/0048;
(Continued)

(56) References Cited

U.S. PATENT DOCUMENTS

| | | |
|---|---|---|
| 9,008,222 B2 | 4/2015 | Stirling-Gallacher et al. |
| 9,088,312 B2 | 7/2015 | Rahman et al. |

(Continued)

FOREIGN PATENT DOCUMENTS

| | | |
|---|---|---|
| CN | 102170330 A | 8/2011 |
| CN | 103281110 A | 9/2013 |

(Continued)

OTHER PUBLICATIONS

International Search Report and Written Opinion—PCT/US2017/051764—ISA/EPO—Dec. 5, 2017.
(Continued)

*Primary Examiner* — Derrick V Rose
(74) *Attorney, Agent, or Firm* — Holland & Hart LLP

(57) ABSTRACT

Methods, systems, and devices for wireless communication are described. A network device, such as a base station, may transmit a request message to a user equipment (UE). The request message may include a request for the UE to transmit a set of sounding reference signals (SRSs). The set of SRSs may include two (or more) beamformed signals. The network device may receive the set of SRSs according to the request message. The network device may identify, based on a co-phasing parameter associated with the two (or more) beamformed signals, an antenna port precoder configuration to use for communicating with the UE.

20 Claims, 16 Drawing Sheets

Related U.S. Application Data continuation of application No. 16/910,534, filed on Jun. 24, 2020, now Pat. No. 11,115,096, which is a continuation of application No. 15/618,969, filed on Jun. 9, 2017, now Pat. No. 10,944,452.

(60) Provisional application No. 62/401,794, filed on Sep. 29, 2016.

(51) Int. Cl.

| | | |
|---|---|---|
| *H04B 7/06* | (2006.01) | |
| *H04W 16/28* | (2009.01) | |
| *H04W 24/10* | (2009.01) | |
| *H04W 72/04* | (2023.01) | |
| *H04W 72/044* | (2023.01) | |
| *H04W 88/02* | (2009.01) | |

(52) U.S. Cl.
CPC ......... *H04B 7/0695* (2013.01); *H04L 5/0048* (2013.01); *H04W 16/28* (2013.01); *H04W 24/10* (2013.01); *H04W 72/046* (2013.01); *H04W 88/02* (2013.01)

(58) Field of Classification Search
CPC ... H04W 16/28; H04W 24/10; H04W 72/046; H04W 88/02
See application file for complete search history.

(56) References Cited

U.S. PATENT DOCUMENTS

| | | |
|---|---|---|
| 9,351,288 B2 | 5/2016 | Pi |
| 9,362,994 B2 | 6/2016 | Seol et al. |
| 9,887,755 B2 | 2/2018 | Kim et al. |
| 10,404,343 B2 | 9/2019 | Islam et al. |
| 10,944,452 B2* | 3/2021 | Islam ............... H04B 7/0695 |
| 11,115,096 B2* | 9/2021 | Islam ............... H04L 5/0048 |
| 11,711,128 B2* | 7/2023 | Islam ............... H04B 7/0695 |
| | | 370/329 |
| 2012/0127878 A1 | 5/2012 | Kim et al. |
| 2015/0009951 A1 | 1/2015 | Josiam et al. |
| 2015/0049824 A1 | 2/2015 | Kim et al. |
| 2015/0200718 A1 | 7/2015 | Sajadieh et al. |
| 2016/0142117 A1 | 5/2016 | Rahman et al. |
| 2016/0218783 A1 | 7/2016 | Janis et al. |
| 2016/0261325 A1 | 9/2016 | Ko et al. |
| 2016/0269158 A1 | 9/2016 | Soriaga et al. |
| 2017/0006593 A1 | 1/2017 | Liu |
| 2017/0201300 A1 | 7/2017 | Parkvall et al. |
| 2018/0213413 A1 | 7/2018 | Roy et al. |
| 2021/0399780 A1 | 12/2021 | Islam et al. |

FOREIGN PATENT DOCUMENTS

| | | |
|---|---|---|
| CN | 103634037 A | 3/2014 |
| CN | 103650364 A | 3/2014 |
| CN | 104753578 A | 7/2015 |
| CN | 105684323 A | 6/2016 |
| EP | 3010158 A1 | 4/2016 |

OTHER PUBLICATIONS

Maattanen H-L., et al., "CQI-Report Optimization for Multi-Mode MIMO with Unitary Codebook Based Precoding", IEEE 20th International Symposium on Personal, Indoor and Mobile Radio Communications (PIMRC 2009), IEEE, Piscataway, NJ, USA, Sep. 13, 2009 (Sep. 13, 2009), pp. 3084-3088.

\* cited by examiner

USE OF UPLINK BEAM TRACKING RESULTS IN REFERENCE SYMBOL SESSIONS

CROSS REFERENCE TO RELATED APPLICATION(S)

The present application for patent is a Continuation of patent application Ser. No. 17/467,107 entitled "USE OF UPLINK BEAM TRACKING RESULTS IN REFERENCE SYMBOL SESSIONS" filed on Sep. 3, 2021, and assigned to the assignee hereof, which is a Continuation of U.S. patent application Ser. No. 16/910,534 by ISLAM, et al., entitled "Use of Uplink Beam Tracking Results in Reference Symbol Sessions," filed Jun. 24, 2020, assigned to the assignee hereof, which is a Continuation of U.S. patent application Ser. No. 15/618,969 by ISLAM, et al., entitled "Use of Uplink Beam Tracking Results in Reference Symbol Sessions," filed Jun. 9, 2017, assigned to the assignee hereof, which claims the benefit of U.S. Provisional Patent Application No. 62/401,794 by ISLAM, et al., entitled "Use of Beam Tracking Results in Reference Symbol Sessions," filed Sep. 29, 2016, assigned to the assignee hereof.

INTRODUCTION

The following relates generally to wireless communication, and more specifically to use of beam tracking results in reference symbol sessions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Wireless communication systems may generally use a beamformed reference signal(s) (BRS(s)) procedure (or beam tracking procedure) to select and/or maintain beams for communications. The BRS procedures may include beamformed signals (e.g., BRS(s) and/or beamformed refinement reference signal(s) (BRRS(s)) exchanged between the base station and the UE. The beams to be used for communication are selected or updated based on the BRS procedure. Conventional procedures, however, may not typically support use of information obtained during BRS procedures for channel condition feedback operations, such as reference signal sessions between the UEs and base stations.

SUMMARY

A method of wireless communication is described. The method may include transmitting one or more beamformed signals to a UE, each beamformed signal associated with an antenna port precoder configuration, receiving, in response to the beamformed signals, a measurement report from the UE, and identifying, based at least in part on the measurement report, an antenna port precoder configuration to use during a reference signal (RS) session associated with the UE.

An apparatus for wireless communication is described. The apparatus may include means for transmitting one or more beamformed signals to a UE, each beamformed signal associated with an antenna port precoder configuration, means for receiving, in response to the beamformed signals, a measurement report from the UE, and means for identifying, based at least in part on the measurement report, an antenna port precoder configuration to use during a RS session associated with the UE.

Another apparatus for wireless communication is described. The apparatus may include a processor, memory in electronic communication with the processor, and instructions stored in the memory. The instructions may be operable to cause the processor to transmit one or more beamformed signals to a UE, each beamformed signal associated with an antenna port precoder configuration, receive, in response to the beamformed signals, a measurement report from the UE, and identify, based at least in part on the measurement report, an antenna port precoder configuration to use during a RS session associated with the UE.

A non-transitory computer readable medium for wireless communication is described. The non-transitory computer-readable medium may include instructions operable to cause a processor to transmit one or more beamformed signals to a UE, each beamformed signal associated with an antenna port precoder configuration, receive, in response to the beamformed signals, a measurement report from the UE, and identify, based at least in part on the measurement report, an antenna port precoder configuration to use during a RS session associated with the UE.

In some examples of the method, apparatus, and non-transitory computer-readable medium described above, the RS session comprises a channel state information reference signal (CSI-RS) session associated with the at least one UE.

Some examples of the method, apparatus, and non-transitory computer-readable medium described above may further include processes, features, means, or instructions for transmitting one or more CSI-RS s to the UE according to the identified antenna port precoder configuration.

Some examples of the method, apparatus, and non-transitory computer-readable medium described above may further include processes, features, means, or instructions for identifying an interference metric associated with the RS session associated with the UE. Some examples of the method, apparatus, and non-transitory computer-readable medium described above may further include processes, features, means, or instructions for identifying the antenna port precoder configuration based at least in part on the interference metric.

In some examples of the method, apparatus, and non-transitory computer-readable medium described above, the identified antenna port precoder configuration comprises an angular separation distance between two or more CSI-RS transmissions.

In some examples of the method, apparatus, and non-transitory computer-readable medium described above, the RS session comprises a sounding reference signal (SRS) session associated with the at least one UE.

Some examples of the method, apparatus, and non-transitory computer-readable medium described above may further include processes, features, means, or instructions for transmitting an indication of the identified antenna port precoder configuration to the UE. Some examples of the method, apparatus, and non-transitory computer-readable medium described above may further include processes, features, means, or instructions for receiving one or more SRS transmissions from the UE, the SRS transmission being transmitted according to the identified antenna port precoder configuration.

In some examples of the method, apparatus, and non-transitory computer-readable medium described above, the measurement report comprises information associated with at least one of a signal-to-noise ratio (SNR), or a signal-to-interference plus noise ratio (SINR), a reference signal received power (RSRP), or a received signal strength indicator (RSSI), a reference signal received quality (RSRQ), or combinations thereof.

Some examples of the method, apparatus, and non-transitory computer-readable medium described above may further include processes, features, means, or instructions for adjusting one or more of a digital beamforming stage, an analog beamforming stage, or combinations thereof, according to the identified antenna port precoder configuration.

In some examples of the method, apparatus, and non-transitory computer-readable medium described above, the digital beamforming stage comprises at least one of a transmission precoder, or a receiver combiner, or a combination thereof.

In some examples of the method, apparatus, and non-transitory computer-readable medium described above, the analog beamforming stage comprises a phase shifter associated with each antenna of an antenna subarray.

A method of wireless communication is described. The method may include receiving a UE RS from a UE, identifying, based at least in part on the UE RS, an antenna port precoder configuration to use during a RS session associated with the UE, and transmitting a RS to the UE according to the identified antenna port precoder configuration.

An apparatus for wireless communication is described. The apparatus may include means for receiving a UE RS from a UE, means for identifying, based at least in part on the UE RS, an antenna port precoder configuration to use during a RS session associated with the UE, and means for transmitting a RS to the UE according to the identified antenna port precoder configuration.

Another apparatus for wireless communication is described. The apparatus may include a processor, memory in electronic communication with the processor, and instructions stored in the memory. The instructions may be operable to cause the processor to receive a UE RS from a UE, identify, based at least in part on the UE RS, an antenna port precoder configuration to use during a RS session associated with the UE, and transmit a RS to the UE according to the identified antenna port precoder configuration.

A non-transitory computer readable medium for wireless communication is described. The non-transitory computer-readable medium may include instructions operable to cause a processor to receive a UE RS from a UE, identify, based at least in part on the UE RS, an antenna port precoder configuration to use during a RS session associated with the UE, and transmit a RS to the UE according to the identified antenna port precoder configuration.

In some examples of the method, apparatus, and non-transitory computer-readable medium described above, the RS comprises CSI-RS.

In some examples of the method, apparatus, and non-transitory computer-readable medium described above, the UE RS comprises SRSs.

Some examples of the method, apparatus, and non-transitory computer-readable medium described above may further include processes, features, means, or instructions for adjusting at least one of a digital beamforming stage, or an analog beamforming stage, or combinations thereof, according to the identified antenna port precoder configuration.

In some examples of the method, apparatus, and non-transitory computer-readable medium described above, the digital beamforming stage comprises at least one of a transmission precoder, or a receiver combiner, or combinations thereof.

In some examples of the method, apparatus, and non-transitory computer-readable medium described above, the analog beamforming stage comprises a phase shifter associated with each antenna of an antenna subarray.

A method of wireless communication is described. The method may include transmitting a set of reference symbols to a UE, the set of reference symbols comprising at least two beamformed signals, receiving, based at least in part on the set of reference symbols, a measurement report from the UE, the measurement report comprising a co-phasing indicator associated with the set of reference symbols, and identifying, based at least in part on the co-phasing indicator, an antenna port precoder configuration to use for communicating with the UE.

An apparatus for wireless communication is described. The apparatus may include means for transmitting a set of reference symbols to a UE, the set of reference symbols comprising at least two beamformed signals, means for receiving, based at least in part on the set of reference symbols, a measurement report from the UE, the measurement report comprising a co-phasing indicator associated with the set of reference symbols, and means for identifying, based at least in part on the co-phasing indicator, an antenna port precoder configuration to use for communicating with the UE.

Another apparatus for wireless communication is described. The apparatus may include a processor, memory in electronic communication with the processor, and instructions stored in the memory. The instructions may be operable to cause the processor to transmit a set of reference symbols to a UE, the set of reference symbols comprising at least two beamformed signals, receive, based at least in part on the set of reference symbols, a measurement report from the UE, the measurement report comprising a co-phasing indicator associated with the set of reference symbols, and identify, based at least in part on the co-phasing indicator, an antenna port precoder configuration to use for communicating with the UE.

A non-transitory computer readable medium for wireless communication is described. The non-transitory computer-readable medium may include instructions operable to cause a processor to transmit a set of reference symbols to a UE, the set of reference symbols comprising at least two beamformed signals, receive, based at least in part on the set of reference symbols, a measurement report from the UE, the measurement report comprising a co-phasing indicator associated with the set of reference symbols, and identify, based at least in part on the co-phasing indicator, an antenna port precoder configuration to use for communicating with the UE.

Some examples of the method, apparatus, and non-transitory computer-readable medium described above may further include processes, features, means, or instructions for determining, based at least in part on the co-phasing indicator, a beamforming direction associated with the UE.

Some examples of the method, apparatus, and non-transitory computer-readable medium described above may further include processes, features, means, or instructions for transmitting a plurality of sets of reference symbols. Some examples of the method, apparatus, and non-transitory computer-readable medium described above may further include processes, features, means, or instructions for receiving the measurement report that comprises a co-phasing indicator associated with each set of reference symbols of the plurality of sets of reference symbols.

Some examples of the method, apparatus, and non-transitory computer-readable medium described above may further include processes, features, means, or instructions for adjusting at least one of a digital beamforming stage, or an analog beamforming stage, or combinations thereof, according to the identified antenna port precoder configuration.

In some examples of the method, apparatus, and non-transitory computer-readable medium described above, the digital beamforming stage comprises at least one of a transmission precoder, or a receiver combiner, or combinations thereof.

In some examples of the method, apparatus, and non-transitory computer-readable medium described above, the analog beamforming stage comprises a phase shifter associated with each antenna of an antenna subarray.

A method of wireless communication is described. The method may include transmitting a request message to a user equipment (UE), the request message comprising a request for the UE to transmit a set of sounding reference signals (SRSs), the set of SRSs comprising at least two beamformed signals, receiving the set of SRSs from the UE in accordance with the request message, and identifying, based at least in part on a co-phasing parameter associated with the at least two beamformed signals, an antenna port precoder configuration to use for communicating with the UE.

An apparatus for wireless communication is described. The apparatus may include means for transmitting a request message to a user equipment (UE), the request message comprising a request for the UE to transmit a set of sounding reference signals (SRSs), the set of SRSs comprising at least two beamformed signals, means for receiving the set of SRSs from the UE in accordance with the request message, and means for identifying, based at least in part on a co-phasing parameter associated with the at least two beamformed signals, an antenna port precoder configuration to use for communicating with the UE.

Another apparatus for wireless communication is described. The apparatus may include a processor, memory in electronic communication with the processor, and instructions stored in the memory. The instructions may be operable to cause the processor to transmit a request message to a user equipment (UE), the request message comprising a request for the UE to transmit a set of sounding reference signals (SRSs), the set of SRSs comprising at least two beamformed signals, receive the set of SRSs from the UE in accordance with the request message, and identify, based at least in part on a co-phasing parameter associated with the at least two beamformed signals, an antenna port precoder configuration to use for communicating with the UE.

A non-transitory computer readable medium for wireless communication is described. The non-transitory computer-readable medium may include instructions operable to cause a processor to transmit a request message to a user equipment (UE), the request message comprising a request for the UE to transmit a set of sounding reference signals (SRSs), the set of SRSs comprising at least two beamformed signals, receive the set of SRSs from the UE in accordance with the request message, and identify, based at least in part on a co-phasing parameter associated with the at least two beamformed signals, an antenna port precoder configuration to use for communicating with the UE.

Some examples of the method, apparatus, and non-transitory computer-readable medium described above may further include processes, features, means, or instructions for determining, based at least in part on the co-phasing parameter, a beamforming direction associated with the UE.

Some examples of the method, apparatus, and non-transitory computer-readable medium described above may further include processes, features, means, or instructions for adjusting at least one of a digital beamforming stage, or an analog beamforming stage, or combinations thereof, according to the identified antenna port precoder configuration.

In some examples of the method, apparatus, and non-transitory computer-readable medium described above, the digital beamforming stage comprises at least one of a transmission precoder, or a receiver precoder, or combinations thereof.

In some examples of the method, apparatus, and non-transitory computer-readable medium described above, the analog beamforming stage comprises a phase shifter associated with each antenna of an antenna subarray.

In some examples of the method, apparatus, and non-transitory computer-readable medium described above, the co-phasing parameter comprises at least one of a phase shift between the two beamformed signals of the set of SRSs, or an angle of arrival between the two beamformed signals of the set of SRSs, or combinations thereof.

Some examples of the method, apparatus, and non-transitory computer-readable medium described above may further include processes, features, means, or instructions for communicating with the UE using one or more beamformed signals configured according to the identified antenna port precoder configuration.

Some examples of the method, apparatus, and non-transitory computer-readable medium described above may further include processes, features, means, or instructions for receiving additional sets of SRSs from the UE over a time period, each set of SRSs comprising at least two beamformed signals. Some examples of the method, apparatus, and non-transitory computer-readable medium described above may further include processes, features, means, or instructions for updating the identified antenna port precoder configuration based at least in part on the additional sets of SRSs from the UE.

DETAILED DESCRIPTION

Figure 1:
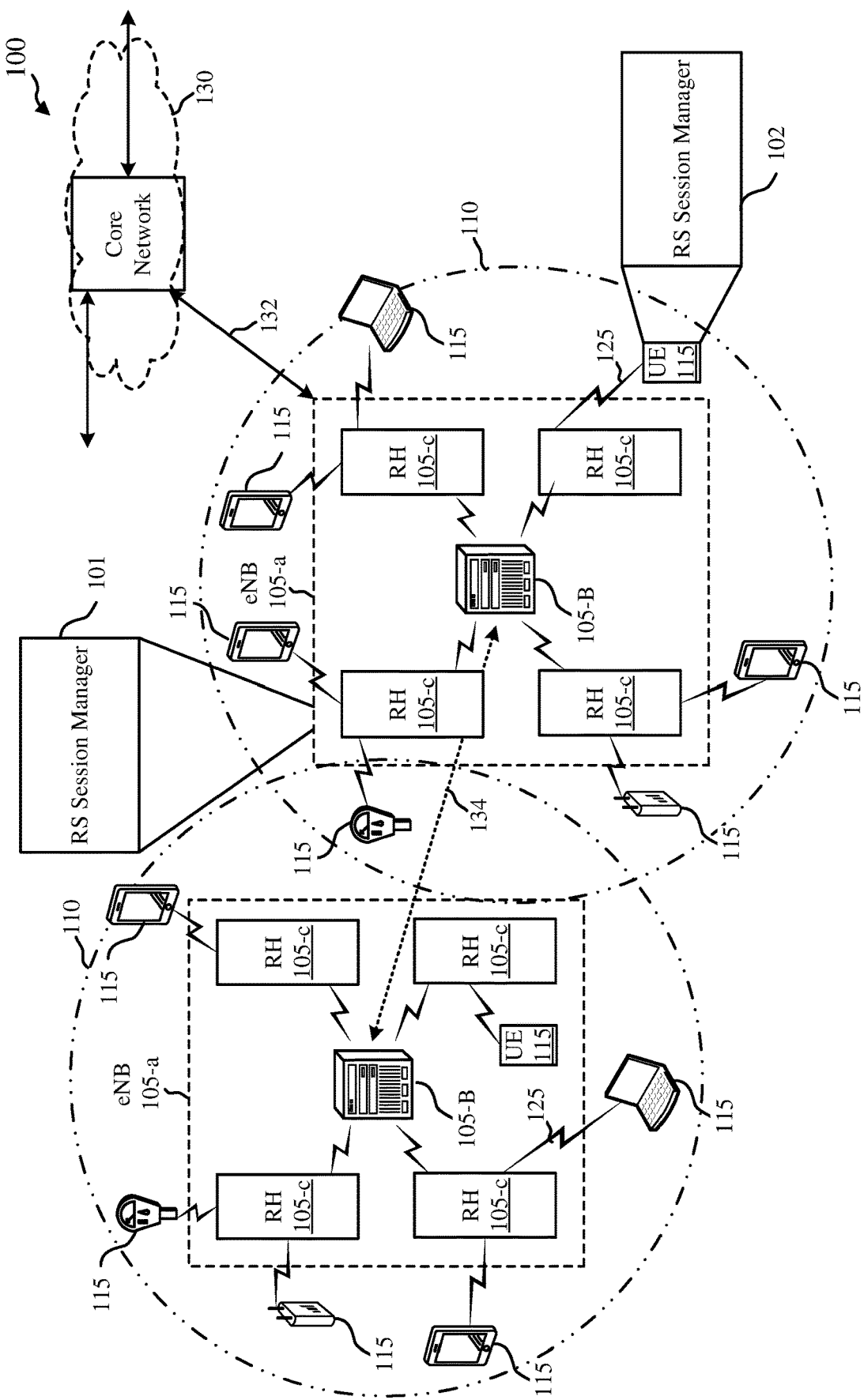
FIG. 1 illustrates an example of a system for wireless communication that supports use of beam tracking results in reference symbol sessions, in accordance with one or more aspects of the present disclosure.

Conventional BRS procedures may not be used to support RS sessions between the UEs and an associated base station, such as a serving base station of the UE. The BRS procedure may include the base station and/or the UE transmitting directional beamformed signals used for beam selection and/or maintenance (e.g., beam tracking). The RS sessions (e.g., CSI-RS sessions and/or SRS sessions) may be used for channel condition measurement and reporting on the uplink and downlink channels. Information learned using the BRS procedures, however, is not leveraged for channel condition measurement and reporting procedures. This may result in increased signaling between the UE and base station.

Aspects of the disclosure are initially described in the context of a wireless communications system. A network device (such as a base station) may be configured to support use of a beam tracking procedure (e.g., BRS procedure) for reference signal sessions between the network device and a UE. For example, a network device may transmit beamformed signals to a UE. The beamformed signals may be associated with an antenna port precoder configuration that includes, in some aspects, a digital beamforming stage (e.g., a transmit precoder and/or receive combiner) and/or an analog beamforming stage (e.g., a phase shifter associated with each antenna of an antenna subarray assembly). The beamformed signals may be BRS and/or BRRS signals. The UE receives the beamformed signals and responds by transmitting a measurement report to the network device that includes information associated with the channel conditions. The network device may use the measurement report to identify an antenna port precoder configuration to use during a RS session with the UE (e.g., a CSI-RS session and/or a SRS session). Additionally or alternatively, the network device receives RS transmissions from the UE (e.g., SRSs) and uses these signals to select the antenna port precoder configuration for the RS session (e.g., the CSI-RS session).

Additionally or alternatively, the network device may transmit a set of RSs to the UE that includes two (or more) beamformed signals. Each beamformed signal in the set may be transmitted at the same directional or departure angle or at different directions or departure angles. The measurement report received from the UE may include a co-phasing indicator associated with the set of beamformed signals. The network device may use the co-phasing indicator to identify the antenna port precoder configuration to use for communications with the UE. Correspondingly, the UE may receive the set of RSs from the network device and identify the co-phasing indicator. The UE may transmit the measurement report to the network device that includes the co-phasing indicator.

Additionally or alternatively, the network device (or base station) may transmit instructions to the UE for the UE to transmit a set of SRSs where the set includes two (or more) beamformed signals. The network device may receive the set of SRSs from the UE and identify the antenna port precoder matrix based, at least in certain aspects, on the co-phasing indicator associated with the two (or more) beamformed signals.

Aspects of the disclosure are further illustrated by and described with reference to apparatus diagrams, system diagrams, and flowcharts that relate to use of beam tracking results in reference symbol sessions.

FIG. 1 illustrates an example of a wireless communication system 100, in accordance with one or more aspects of the present disclosure. The wireless communication system 100 may include network devices 105 (e.g., gNodeBs (gNBs), base stations, etc.), UEs 115, and a core network 130. Wireless communication system 100 may support dynamic reception opportunity (RO) and transmit opportunity (TO) configurations to enable reduced latency and reduced power consumption. For example, wireless communication system 100 may support a TO following the reception of data during the on duration of a discontinuous reception (DRX) configuration. Additionally or alternatively, a subsequent RO may follow the transmission of data during the on duration of a discontinuous transmission (DTX) configuration.

The core network 130 may provide user authentication, access authorization, tracking, Internet Protocol (IP) connectivity, and other access, routing, or mobility functions. At least some of the network devices 105 (e.g., network device 105-*a*, which may be an example of an evolved node B (eNB), gNB, or a base station, or network device 105-*b*, which may be an example of an access node controller (ANC)) may interface with the core network 130 through backhaul links 132 (e.g., S1, S2, etc.) and may perform radio configuration and scheduling for communication with the UEs 115. In various examples, the network devices 105-*b* may communicate, either directly or indirectly (e.g., through core network 130), with each other over backhaul links 134 (e.g., X1, X2, etc.), which may be wired or wireless communication links. Each ANC may additionally or alternatively communicate with a number of UEs 115 through a number of smart radio heads. In an alternative configuration of the wireless communication system 100, the functionality of an ANC may be provided by a radio head or distributed across the radio heads of a gNB.

Each network device 105-*b* may also communicate with a number of UEs 115 through a number of other network devices 105-*c*, where network device 105-*c* may be an example of a smart radio head. In alternative configurations, various functions of each network device 105 may be distributed across various network devices 105 (e.g., radio heads and access network controllers) or consolidated into a single network device 105 (e.g., abase station).

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a wireless node, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an internet of everything (IoE) device, or the like. A UE 115 may be able to communicate with various types of network devices 105-*a*, network devices 105-*c*, base stations, access points, or other network devices, including macro eNBs, small cell eNBs, relay base stations, and the like. A UE 115 may also be able to communicate directly with other UEs (e.g., using a peer-to-peer (P2P) protocol).

The communication links 125 shown in wireless communication system 100 may include uplink (UL) channels from a UE 115 to a network device 105-*c*, and/or downlink (DL) channels, from a network device 105-*c* to a UE 115. The DL channels may also be called forward link channels, while the UL channels may also be called reverse link channels. Control information and data may be multiplexed on an UL channel or DL according to various techniques. Control information and data may be multiplexed on a DL channel, for example, using time-division multiplexing (TDM) techniques, frequency-division multiplexing (FDM) techniques, or hybrid TDM-FDM techniques. In some examples, the control information transmitted during a transmit time interval (TTI) of a DL channel may be distributed between different control regions in a cascaded manner (e.g., between a common control region and one or more UE-specific control regions).

A UE 115 attempting to access a network device 105 may perform an initial cell search by detecting a synchronization signal from a network device 105. The synchronization signal may indicate system information and enable synchronization of timing and may indicate an identity value of the network device 105. The UE 115 may receive a second synchronization signal that also indicates the system information and enables synchronization of the timing information. The first and second synchronization signals may be received during different transmission times, e.g., during different symbol periods or different subframes.

In one example where wireless communication system 100 supports mmW wireless communications, the synchronization process and/or the beam maintenance procedure may be referred to as a BRS procedure and may include BRS transmissions that may be swept in different beam directions to cover the entire coverage area 110 of the network device 105. For example, network device 105 may transmit a one or more BRS(s) during a first transmission time, one or more other BRS(s) and/or BRRS(s) during a second transmission time, and so on. In one non-limiting example, the base station may transmit a BRS from each antenna port during a first transmission time, and a BRS in a different direction from the antenna port in the second transmission time, and so on. The BRS transmissions may continue in a sweeping pattern around the coverage area 110 of each network device 105. The network device 105 may also include one or more BRRS(s) transmitted during the BRS procedure. In some aspects, the BRSs may be considered course beams and the BRRSs may be considered fine beams.

In some aspects, beamformed transmissions and/or receptions may be beamformed and/or shaped according to an antenna port precoder configuration. The antenna port precoder configuration may include an analog beamforming stage that includes at least one phase shifter associated with each antenna of an antenna subarray. The antenna port precoder configuration may include a digital beamforming stage that includes at least one transmission precoder (on the transmit side) and/or a receiver combiner (on the receive side). The antenna port precoder configuration may be used to direct and/or shape the signal transmitted and/or received.

In certain aspects, a network device 105 may include a RS session manager 101 that may support the described techniques and transmit beamformed signals (e.g., BRS and/or BRRS) to a UE 115. Each beamformed signal may be associated with an antenna port precoder configuration, e.g., a configuration that adjusts the analog and/or digital beamforming stages to determine the direction and/or shape of the beamformed signal. The network device 105 may receive a measurement report from the UE 115 responsive to the beamformed signals. The measurement report may include one or more indicators associated with measured channel conditions. The RS session manager 101 may identify an antenna port precoder configuration to use during a RS session with the UE 115 that is based at least in part on the measurement reports.

Additionally or alternatively, the RS session manager 101 may receive RS(s) from the UE 115 (e.g., UE RSs or SRSs). The RS session manager 101 may identify the antenna port precoder configuration to use for the RS session based on the received UE RSs. The RS session manager 101 may transmit a RS (e.g., a CSI-RS) to the UE 115 according to the antenna port precoder configuration.

Additionally or alternatively, the RS session manager 101 may transmit a set of RSs to the UE 115. The set of RSs may include two (or more than two) beamformed signals. The measurement report received from the UE 115 may include a co-phasing indicator associated with the set of reference signals. The co-phasing indicator may include an indication associated with a phase shift between the two beamformed signals of the set of RSs, an angle of arrival between the two beamformed signals, and the like. The RS session manager 101 may identify an antenna port precoder configuration to use for communications with the UE 115 based on the co-phasing indicator.

Additionally or alternatively, the RS session manager 101 may transmit a request message to a UE 115. The request message may include a request for the UE 115 to transmit a set of SRSs that includes two (or more) beamformed signals. The RS session manager 101 may receive the set of SRSs from the UE 115 and identify an antenna port precoder configuration to use for communicating with the UE 115. The antenna port precoder configuration may be identified based on a co-phasing parameter associated with the two (or more) beamformed signals.

In certain aspects, a UE 115 may include a RS session manager 102 that may support the described techniques and transmit beamformed signals (e.g., BRS and/or BRRS) to a UE 115. Each beamformed signal may be associated with an antenna port precoder configuration, e.g., a configuration that adjusts the analog and/or digital beamforming stages to determine the direction and/or shape of the beamformed signal. The RS session manager 102 may receive a set of reference symbols from a base station that includes two (or more) beamformed signals. The RS session manager 102 may identify a co-phasing indicator associated with the set of reference symbols that is based on the two (or more) beamformed signals. The RS session manager 102 may transmit a measurement report to the base station that includes the co-phasing indicator.

Figure 2:
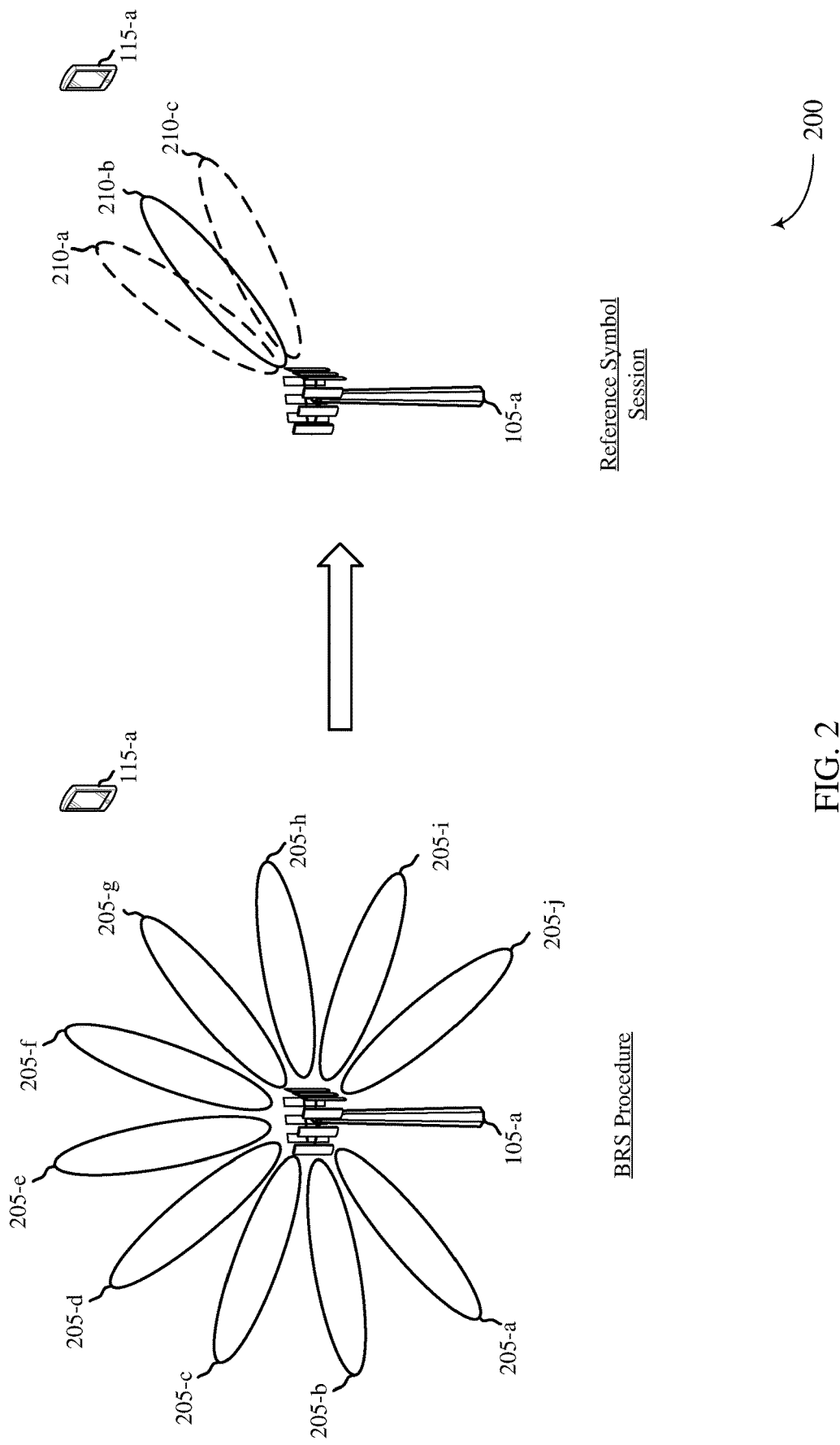
FIG. 2 illustrates an example of a system for wireless communication that supports use of beam tracking results in reference symbol sessions, in accordance with one or more aspects of the present disclosure.

FIG. 2 illustrates an example of a wireless communication system 200 for use of beam tracking results in reference symbol sessions, in accordance with one or more aspects of the present disclosure. Wireless communication system 200 may implement one or more aspects of wireless communication system 100 of FIG. 1. Wireless communication system 200 may include a network device 105-a and a UE 115-a, which may be examples of the corresponding devices of FIG. 1. In some aspects, the network device 105-a may be a base station, such as a mmW base station. Broadly, wireless communication system 200 illustrates aspects of use of a beam tracking results in CSI-RS sessions between the network device 105-a and the UE 115-a.

In some examples, network device 105-a may be a serving base station for UE 115-a. Network device 105-a may be a mmW base station that transmits beamformed transmissions to UE 115-a. The transmissions from network device 105-a may be beamformed or directional transmissions that are directed towards UE 115-a. The direction and/or shape of the beamformed signals may be determined or selected based on an antenna port precoder configuration.

For example, network device 105-a may initially perform a BRS procedure with UE 115-a to identify and/or establish an active beam for beamformed signal transmissions. The BRS procedure may include network device 105-a transmitting a plurality of beamformed signals 205 (e.g., BRS and/or BRRS signals). Beamformed signals 205 may be transmitted in a shaped or directional manner where each beamformed signal 205 is transmitted in a different direction. Beamformed signals 205 may be associated with an antenna port precoder configuration (e.g., an analog and/or digital beamforming stage that determines the direction and/or shape of each beamformed signal 205). For example, beamformed signal 205-a may be transmitted in a first direction or shape, beamformed signal 205-b may be transmitted in a second direction or shape, and so on. Thus, network device 105-a may transmit a sufficient number of beamformed signals 205 and/or at sufficient directional spacing, to cover the entire coverage area of network device 105-a.

In some aspects, the BRS procedure may include one or more refinement beams (e.g., BRRSs) used to refine the UE 115-a active beam, and possibly offer potential candidate beams. Each beamformed signal 205 used for refinement may also be associated with an antenna port precoder configuration associated with the direction and/or shape. The BRS procedure may be used by network device 105-a, UE 115-a, and other UEs within the coverage area of network device 105-a to establish and/or maintain an active beam for communications between network device 105-a and the UEs.

In some aspects, UE 115-a may transmit and network device 105-a may receive a measurement report. The measurement report may include an indication of the channel quality associated with the received beamformed signals 205. Examples of the channel quality indicators may include, but are not limited to, a signal-to-noise ratio (SNR), a signal-to-interference plus noise ratio (SINR), a reference signal received power (RSRP), a received signal strength indicator (RSSI), a reference signal received quality (RSRQ), a measured throughput rate, and/or some other indicator associated with the downlink channel used for the received beamformed signals 205. The measurement report may include or otherwise convey an indication of the channel quality for one or more beamformed signals 205. For example, the measurement report may include a channel quality indicator for beamformed signals 205-f, 205-g, and 205-h. The order of beamformed signals 205 being reported in the measurement report may be based on the channel quality of each reported beamformed signal 205, based on the resource ID associated with each reported beamformed signal 205, based on a sequential listing or order of each reported beamformed signal 205, etc.

Network device 105-a may use the measurement reports received from UE 115-a (and other UEs providing measurement reports for the beamformed signals 205) to select beams for an RS session with the UE 115-a. For example, network device 105-a may use the information conveyed in the measurement reports to identify an antenna port precoder configuration to use during the RS session with the UE 115-a. The antenna port precoder configuration may include an analog and/or a digital beamforming stages that are adjusted to beamform the RS transmissions used during the RS session. In the example wireless communication system 200, the RS session may be a CSI-RS session where the network device 105-a transmits CSI-RSs 210 to UE 115-a. The CSI-RSs 210 may include one or more beamformed CSI-RSs 210, such as beamformed CSI-RS 210-b and, optionally, beamformed CSI-RSs 210-a and/or 210-c. The CSI-RSs 210 used for the CSI-RS session may be used by UE 115-a to estimate the channel quality and report the CQI to network device 105-a.

Network device 105-a may also consider other factors or metrics when identifying the antenna port precoder configuration to use for the CSI-RS session. For example, network device 105-a may also consider an interference metric associated with the RS session and identify the antenna port precoder configuration based on the interference metric. The interference metric may be based on an amount of interference that the CSI-RS 210 transmission may cause to other UEs, in one example. In some aspects, network device 105-a may identify an antenna port precoder configuration that may be suitable, but less than optimal, for the CSI-RS 210 transmission to UE 115-*a* based on the transmission causing less or no interference for a neighboring UE.

Thus, network device 105-*a* may use different performance metrics to select the antenna port precoder configuration for the RS session. For example, the selected beams in terms of channel quality may be used for the RS session. In some aspects, network device 105-*a* may identify an antenna port precoder configuration based on angular separation domain, e.g., either close departure angle or distant departure angle based on the merits of either option.

Transmitting the CSI-RSs 210 during the RS session may include network device 105-*a* adjusting the analog beamforming stage (e.g., adjusting one or more phase shifters associated with an antenna port of an antenna array or subarray) and/or adjusting the digital beamforming stage (e.g., adjusting the transmitter precoder).

Thus, use of the beam tracking results may support the RS session between the network device 105-*a* and the UE 115-*a*. This may conserve additional overhead signaling used for beam selection during the RS session.

Figure 3:
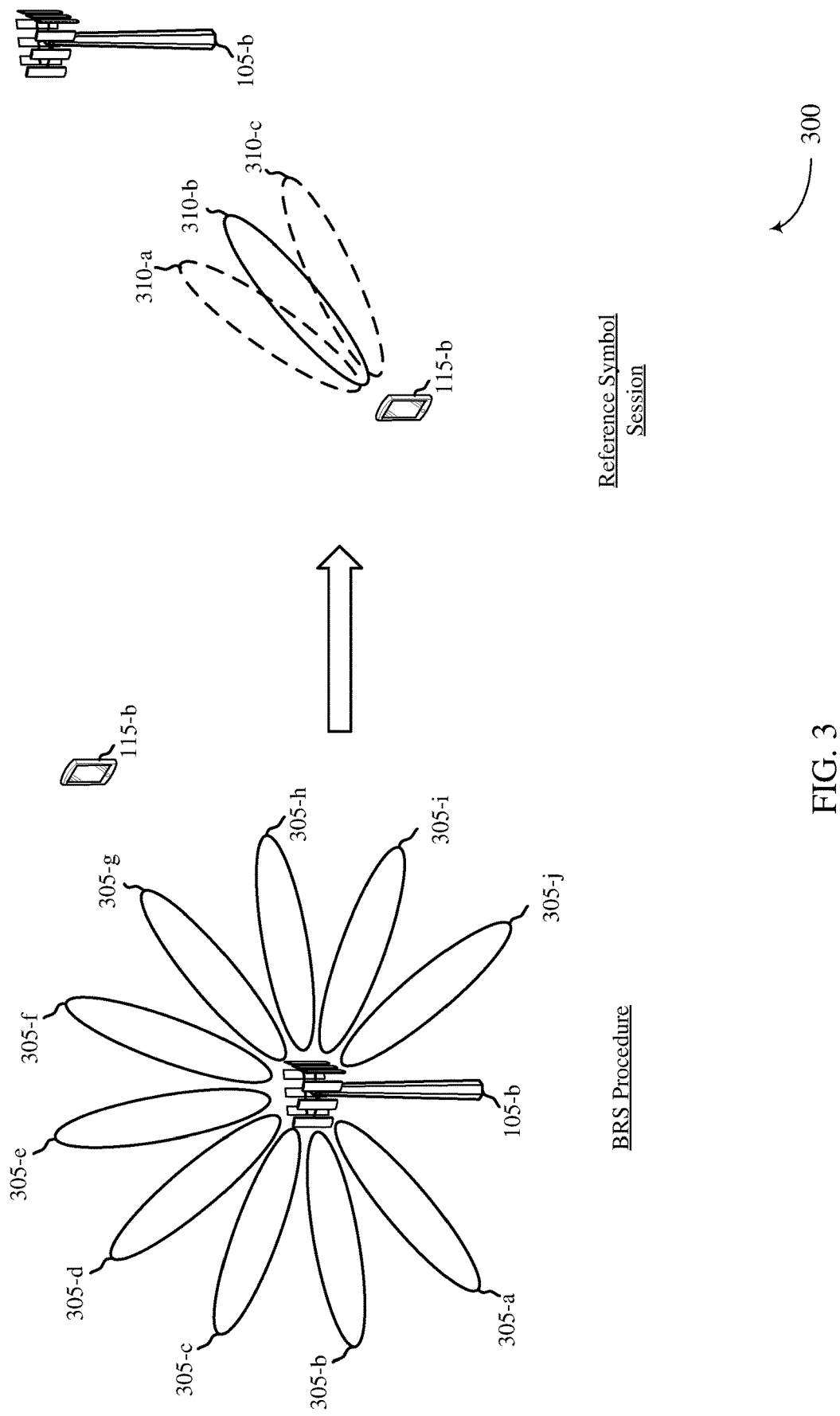
FIG. 3 illustrates an example of a system for wireless communication that supports use of beam tracking results in reference symbol sessions, in accordance with one or more aspects of the present disclosure.

FIG. 3 illustrates an example of a wireless communication system 300 for use of beam tracking results in reference symbol sessions, in accordance with one or more aspects of the present disclosure. Wireless communication system 300 may implement one or more aspects of wireless communication systems 100 and/or 200 of FIGS. 1 and 2. Wireless communication system 300 may include a network device 105-*b* and a UE 115-*b*, which may be examples of the corresponding devices of FIGS. 1 and/or 2. In some aspects, the network device 105-*b* may also be referred to as a base station, such as a mmW base station. Broadly, wireless communication system 300 illustrates aspects of use of beam tracking results in an SRS sessions between the network device 105-*b* and the UE 115-*b*.

Generally, network device 105-*b* may transmit one or more beamformed signals 305 to UE 115-*b* during a BRS procedure substantially as described with respect to FIG. 2. Moreover, UE 115-*b* may transmit and network device 105-*b* may receive a measurement report including channel quality indicators, substantially as described with respect to FIG. 2.

However, in wireless communication system 300, the RS session may be a SRS session where the UE 115-*b* transmits one or more SRSs 310 to network device 105-*b*. For example, network device 105-*b* may use the measurement reports received from UE 115-*b* (and other UEs providing measurement reports for the beamformed signals 305) to select beams for a RS session with the UE 115-*b*. Network device 105-*b* may use the information conveyed in the measurement reports to identify an antenna port precoder configuration to use during the RS session with the UE 115-*b*. The antenna port precoder configuration may include an analog and/or a digital stage used for beamforming the RSs used during the RS session. In the example wireless communication system 300, the RS session may be a SRS session where the network device 105-*b* identifies an antenna port precoder configuration that UE 115-*b* will use during the SRS session. Network device 105-*b* may transmit an indication of the identified antenna port precoder configuration to the UE 115-*b*. The UE 115-*b* may use the indicated antenna port precoder configuration to transmit the SRSs 310 to network device 105-*b*. The SRSs 310 may include one or more beamformed SRSs 310, such as beamformed SRS 310-*b* and, optionally, beamformed SRSs 310-*a* and/or 310-*c*. The SRSs 310 used for the SRS session may be used by network device 105-*b* to estimate the UL channel quality and, when reciprocity is present, aspects of the DL channel quality.

Transmitting the SRSs 310 during the SRS session may include UE 115-*b* adjusting the analog beamforming stage (e.g., adjusting one or more phase shifters associated with an antenna port of an antenna array or subarray) and/or adjusting the digital beamforming stage (e.g., adjusting the transmitter precoder) to select the direction and/or shape of the SRSs 310.

Figure 4:
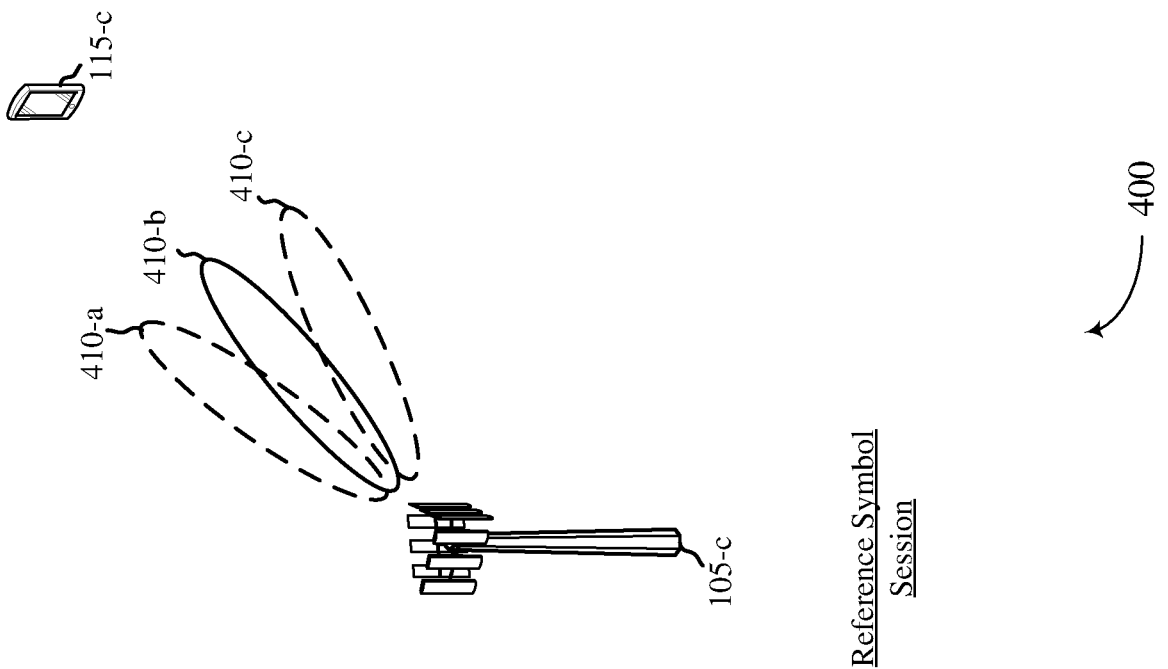
FIG. 4 illustrates an example of a system for wireless communication that supports use of beam tracking results in reference symbol sessions, in accordance with one or more aspects of the present disclosure.
Figure 4:
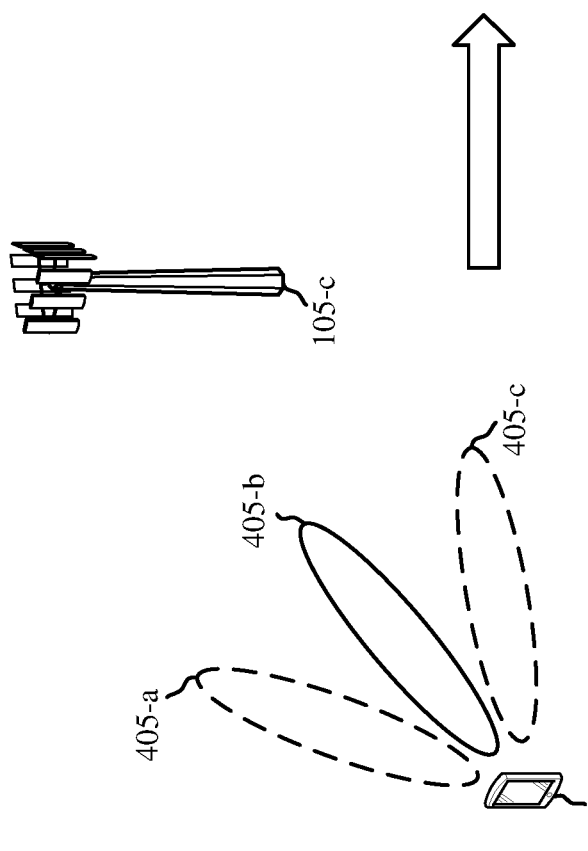

FIG. 4 illustrates an example of a wireless communication system 400 for use of beam tracking results in reference symbol sessions, in accordance with one or more aspects of the present disclosure. Wireless communication system 400 may implement one or more aspects of wireless communication systems 100, 200, and/or 300 of FIGS. 1 through 3. Wireless communication system 400 may include a network device 105-*c* and a UE 115-*c*, which may be examples of the corresponding devices of FIGS. 1 through 3. In some aspects, the network device 105-*c* may also be referred to as a base station, such as a mmW base station. Broadly, wireless communication system 400 illustrates aspects of use of a beam tracking results in CSI-RS sessions between the network device 105-*c* and the UE 115-*c*.

Generally, UE 115-*c* may transmit one or more SRSs 405 to network device 105-*c* during an SRS procedure. The SRSs 405 may be beamformed signals that are transmitted according to an antenna port precoder configuration. UE 115-*c* may adjust an analog and/or digital beamforming stage to shape and/or direct the SRSs 405 in different directions. For example, SRS 405-*a* may be directed in a first direction or shape, SRS 405-*b* may be directed in a second direction or shape, and SRS 405-*c* may be directed in a third direction or shape.

Network device 105-*c* may use the received SRSs 405 to identify an antenna port precoder configuration to use for an RS session with UE 115-*c*. For example, the RS session may be a CSI-RS session where the network device 105-*c* transmits one or more CSI-RSs 410 to UE 115-*c*. For example, network device 105-*c* may measure one or more signal qualities based on the received SRSs 405 to select beams for the CSI-RS session with the UE 115-*c*. The measured signal qualities may include an SNR, SINR, RSRP, RSSI, RSRQ, and the like. Network device 105-*c* may use the measurements to identify an antenna port precoder configuration to use during the RS session with the UE 115-*c*. The antenna port precoder configuration may include an analog and/or a digital beamforming stage used for beamforming and shaping the CSI-RSs 410 during the RS session. In the example wireless communication system 400, the RS session may be a CSI-RS session where the network device 105-*c* adjusts the indicated antenna port precoder configuration to transmit the CSI-RSs 410 to UE 115-*c*. The CSI-RSs 410 may include one or more beamformed CSI-RSs 410, such as beamformed CSI-RS 410-*b* and, optionally, beamformed CSI-RSs 410-*a* and/or 410-*c*.

Transmitting the CSI-RSs 410 during the RS session may include network device 105-*c* adjusting the analog beamforming stage (e.g., adjusting one or more phase shifters associated with an antenna port of an antenna array or subarray) and/or adjusting the digital beamforming stage (e.g., adjusting the transmitter precoder) to determine the shape and/or direction for CSI-RS s 410.

Figure 5:
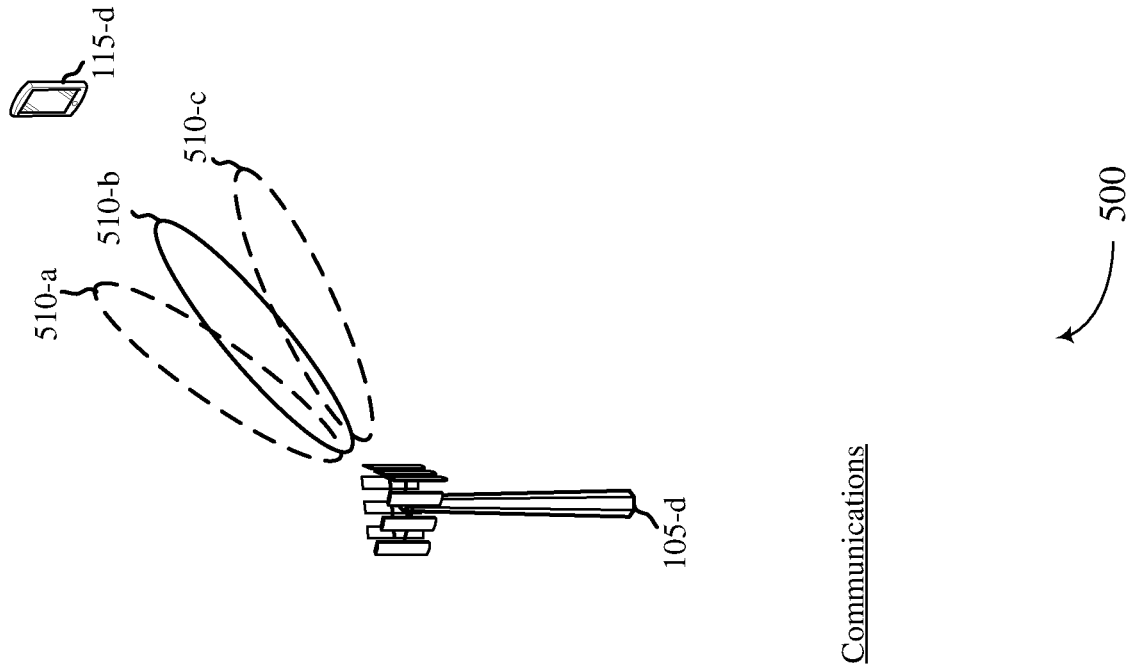
FIG. 5 illustrates an example of a system for wireless communication that supports use of beam tracking results in reference symbol sessions, in accordance with one or more aspects of the present disclosure.
Figure 5:
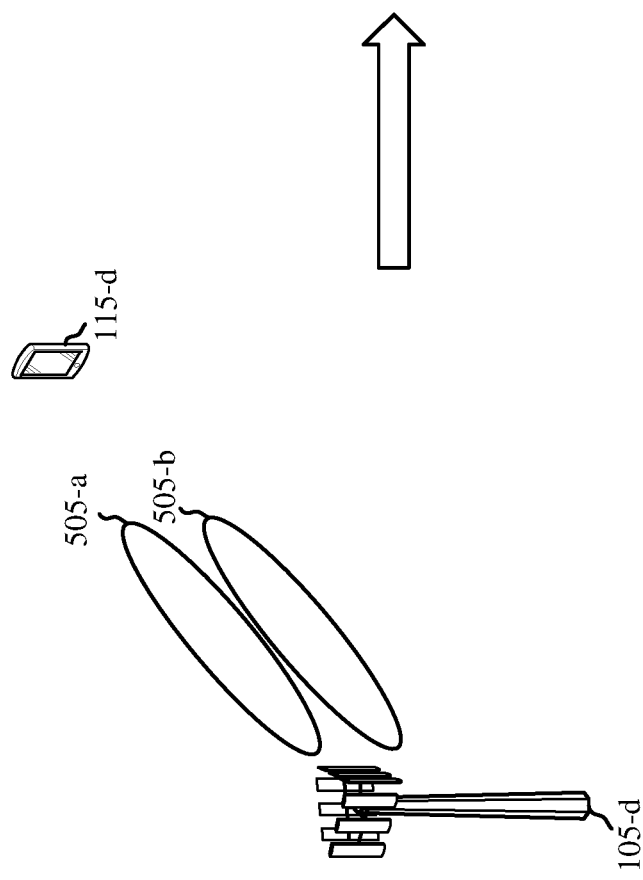

FIG. 5 illustrates an example of a wireless communication system 500 for use of beam tracking results in reference symbol sessions, in accordance with one or more aspects of the present disclosure. Wireless communication system 500 may implement one or more aspects of wireless communication systems 100, 200, 300, and/or 400 of FIGS. 1 through 4. Wireless communication system 500 may include a network device 105-d and a UE 115-d, which may be examples of the corresponding devices of FIGS. 1 through 4. In some aspects, the network device 105-d may also be referred to as a base station, such as a mmW base station.

Generally, network device 105-d may transmit a set of RSs 505 to UE 115-d during a BRS procedure, such as a co-phasing procedure. The set of RSs 505 may include at least two beamformed signals (e.g., RS 505-a and RS 505-b). The set of RSs 505 may, however, include more than two RSs 505. The RSs 505 may be beamformed signals that are transmitted according to an antenna port precoder configuration. For example, the network device 105-d may adjust an analog and/or digital beamforming stage to shape and/or direct the RSs 505 in different directions or in the same direction. In some aspects, network device 105-d may transmit each beamformed signal of the set of RSs 505 using a different antenna subarray, antenna port, etc.

In some aspects, UE 115-d may transmit and network device 105-d may receive a measurement report. The measurement report may include a co-phasing indicator associated with the set of RSs 505. The co-phasing indicator may be associated with a phase difference between the two beamformed signals of the set of RSs 505. Additionally or alternatively, the co-phasing may be associated with an angle of arrival measurement associated with the two beamformed signals of the set of RSs 505.

Network device 105-d may use the measurement reports received from UE 115-d (and other UEs providing measurement reports for the set of RSs 505) to select beams 510 for communications with the UE 115-d. For example, network device 105-a may use the information conveyed in the measurement reports to identify an antenna port precoder configuration to use during the communications with the UE 115-d. The antenna port precoder configuration may include an analog and/or a digital stage used for beamforming or shaping the transmissions used during the communications. In the example wireless communication system 500, the beams 510 used for communication with the UE 115-d may include a beam 510-b and, optionally, beams 510-a and/or 510-c.

Transmitting the beams 510 during the communications may include network device 105-d adjusting the analog beamforming stage (e.g., adjusting one or more phase shifters associated with an antenna port of an antenna array or subarray) and/or adjusting the digital beamforming stage (e.g., adjusting the transmitter precoder) to determine the shape and/or direction of beams 510.

In some aspects, network device 105-d may transmit multiple sets of RSs 505 to UE 115-d. Each set of RSs 505 may include two (or more than two beamformed signals). UE 115-d may receive each set of RSs 505 and respond by providing a measurement report that includes a co-phasing associated with each set of RSs 505.

In some aspects, network device 105-d may transmit two or more beams to UE 115-d and receive from UE 115-d a measurement report that includes the co-phasing indicator. Network device 105-d may determine from the measurement report a refined beam for communicating with UE 115-d. The measurement report may include the indication of the co-phasing terms for co-phasing of the two or more beamformed signals in the RSs 505. The two or more beamformed signals may be orthogonal (e.g., time division multiplexed (TDM), frequency division multiplexed (FDM), code division multiplexed (CDM), etc.). Network device 105-d may transmit the RSs 505 during a CSI-RS procedure and/or a different RS procedure (e.g., pre-CSI). Network device 105-d may transmit multiple groups of beams where each group includes two or more beamformed signals. The UE 115-d may compute and report the co-phasing terms for beams within each group.

Generally, network device 105-d may transmit a set of RSs 505 to UE 115-d during a BRS procedure, such as a co-phasing procedure. The set of RSs 505 may include at least two beamformed signals (e.g., RS 505-a and RS 505-b). The set of RSs 505 may, however, include more than two RSs 505. The RSs 505 may be beamformed signals that are transmitted according to an antenna port precoder configuration. For example, the network device 105-d may adjust an analog and/or digital beamforming stage to shape and/or direct the RSs 505 in different directions or in the same direction. In some aspects, network device 105-d may transmit each beamformed signal of the set of RSs 505 using a different antenna subarray, antenna port, etc.

In some aspects, the described techniques may be used by the network device 105-d to determine the antenna port precoder configuration based on SRSs received from UE 115-d. For example, network device 105-d may transmit a request message to UE 115-d (e.g., in one of RSs 505 or in addition to one of RSs 505). The request message may include a request for UE 115-d to transmit the set of SRSs to the network device 105-d. The set of SRSs may be similar to RSs 505 and may include two (or more) beamformed signals. The network device 105-d may receive the set of SRSs according to the request message and identify the antenna port precoder configuration based on co-phasing parameter(s) associated with the two (or more) beamformed signals. The co-phasing parameter(s) may include an angle of arrival for each beamformed signal, and the like. In some aspects, the network device 105-d may calculate, receive information associated with, or otherwise determine the co-phasing parameter(s). The network device 105-d may use the antenna port precoder configuration for subsequent communications with the UE 115-d.

Figure 6:
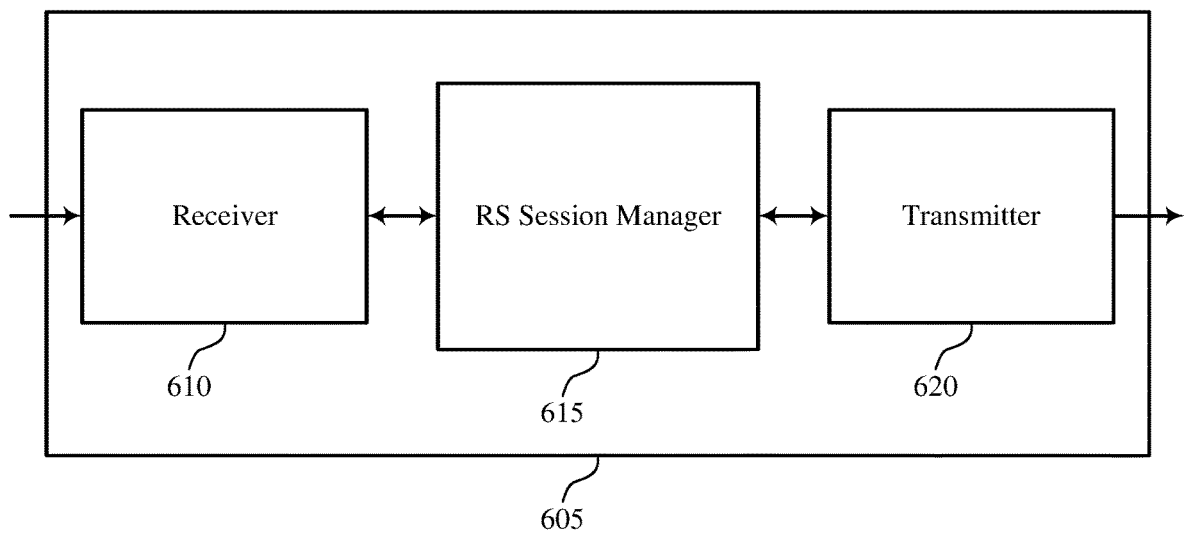
FIGS. 6 through 8 show block diagrams of a device that supports use of beam tracking results in reference symbol sessions, in accordance with one or more aspects of the present disclosure.

FIG. 6 shows a block diagram 600 of a device 605 that supports use of beam tracking results in reference symbol sessions, in accordance with one or more aspects of the present disclosure. Device 605 may be an example of aspects of a network device 105 (such as a base station) as described with reference to FIGS. 1 through 5. Device 605 may include a receiver 610, a RS session manager 615, and a transmitter 620. The RS session manager 615 may be referred to as a base station RS session manager 615. Device 605 may also include a processor. Each of these components may be in communication with one another (e.g., via one or more buses).

Receiver 610 may receive information such as packets, user data, or control information associated with various information channels (e.g., control channels, data channels, and information related to use of beam tracking results in reference symbol sessions, etc.). Information may be passed on to other components of the device 605. The receiver 610 may be an example of aspects of the transceiver 935 described with reference to FIG. 9.

RS session manager 615 may be an example of one or more aspects of the RS session manager 915 described with reference to FIG. 9. RS session manager 615 may transmit one or more beamformed signals to a UE. Each beamformed signal may be associated with an antenna port precoder configuration. RS session manager 615 may receive, in response to the beamformed signals, a measurement report from the UE. RS session manager 615 may identify, based on the measurement report, an antenna port precoder configuration to use during a RS session associated with the UE.

Additionally or alternatively, RS session manager 615 may receive a UE RS from a UE. RS session manager 615 may identify, based on the UE RS, an antenna port precoder configuration to use during a RS session associated with the UE. RS session manager 615 may transmit a RS to the UE according to the identified antenna port precoder configuration.

Additionally or alternatively, RS session manager 615 may transmit a set of reference symbols to a UE, the set of reference symbols including at least two beamformed signals. RS session manager 615 may receive, based on the set of reference symbols, a measurement report from the UE, the measurement report including a co-phasing indicator associated with the set of reference symbols. RS session manager 615 may identify, based on the co-phasing indicator, an antenna port precoder configuration to use for communicating with the UE.

Additionally or alternatively, RS session manager 615 may transmit a request message to a UE. The request message may include a request for the UE to transmit a set of SRSs to the network device, where each set of SRSs includes two (or more) beamformed signals. The RS session manager 615 may receive the set of SRSs from the UE in accordance with the request message. The RS session manager 615 may identify, based at least in part on a co-phasing parameter associated with the two (or more) beamformed signals, an antenna port precoder configuration to use for communicating with the UE.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
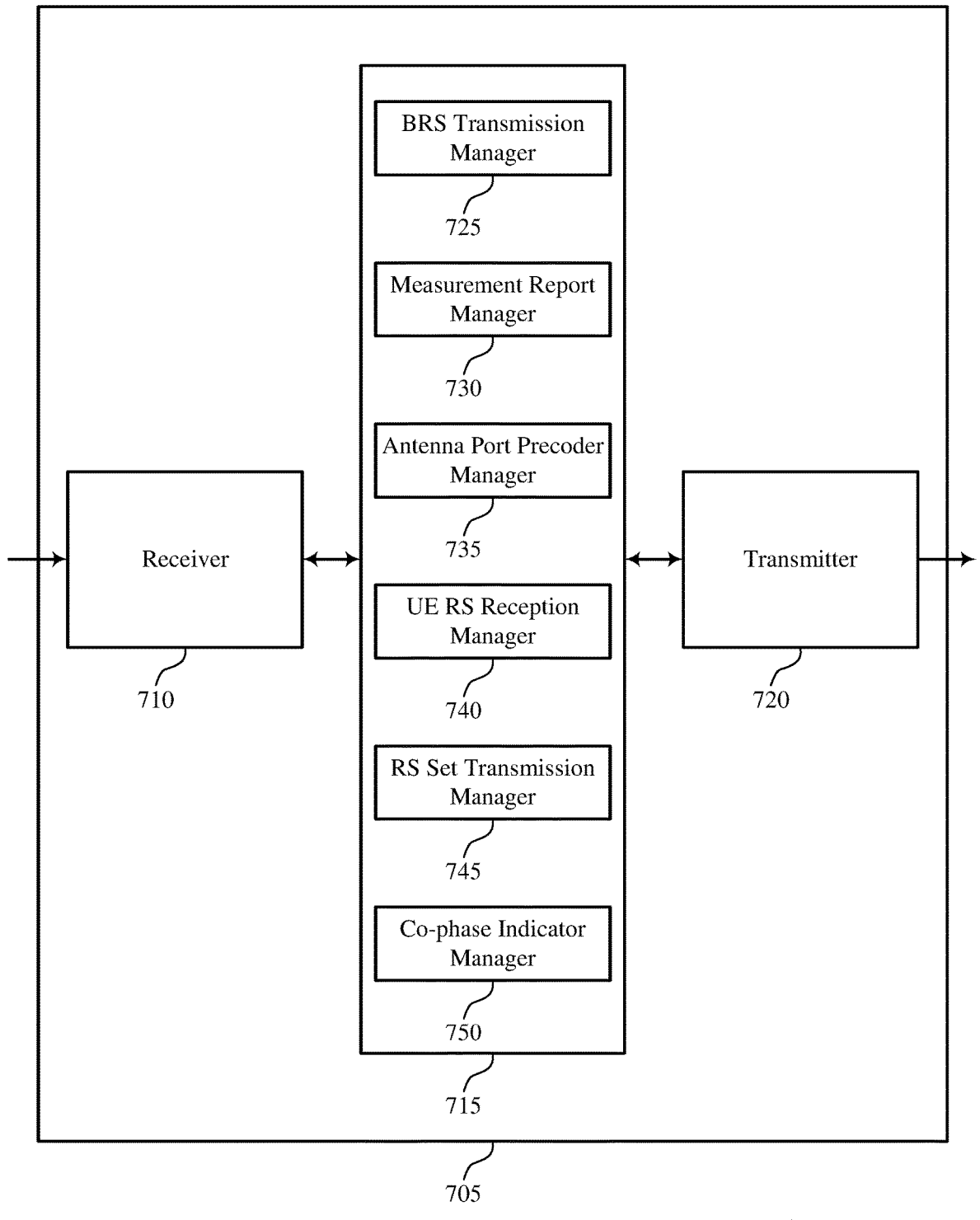

FIG. 7 shows a block diagram 700 of a device 705 that supports use of beam tracking results in reference symbol sessions, in accordance with one or more aspects of the present disclosure. Device 705 may be an example of aspects of a device 605 or a network device 105 as described with reference to FIGS. 1 through 6. Device 705 may include a receiver 710, a RS session manager 715, and a transmitter 720. Device 705 may also include a processor. Each of these components may be in communication with one another (e.g., via one or more buses).

Receiver 710 may receive information such as packets, user data, or control information associated with various information channels (e.g., control channels, data channels, and information related to use of beam tracking results in reference symbol sessions, etc.). Information may be passed on to other components of the device 705. The receiver 710 may be an example of aspects of the transceiver 935 described with reference to FIG. 9.

RS session manager 715 may be an example of aspects of the RS session manager 915 described with reference to FIG. 9. RS session manager 715 may also include a BRS transmission manager 725, a measurement report manager 730, an antenna port precoder manager 735, a UE RS reception manager 740, a RS set transmission manager 745, and a co-phase indicator manager 750.

BRS transmission manager 725 may transmit one or more beamformed signals to a UE, each beamformed signal associated with an antenna port precoder configuration. BRS transmission manager 725 may transmit a RS to the UE according to the identified antenna port precoder configuration. BRS transmission manager 725 may transmit a request message to a UE that includes a request for the UE to transmit a set of SRSs, where the set of SRSs includes two (or more) beamformed signals. BRS transmission manager 725 may receive the set of SRSs from the UE according to the request message.

Measurement report manager 730 may receive, in response to the beamformed signals, a measurement report from the UE. Measurement report manager 730 may receive, based on the set of reference symbols, a measurement report from the UE, the measurement report including a co-phasing indicator associated with the set of reference symbols. Measurement report manager 730 may receive the measurement report that includes a co-phasing indicator associated with each set of reference symbols of the set of sets of reference symbols. In some cases, the measurement report includes information associated with at least one of a SNR, or a SINR, a RSRP, or a RSSI, a RSRQ, or combinations thereof.

Antenna port precoder manager 735 may identify, based on the measurement report, an antenna port precoder configuration to use during a RS session associated with the UE. Antenna port precoder manager 735 may adjust one or more of a digital beamforming stage, an analog beamforming stage, or combinations thereof, according to the identified antenna port precoder configuration. In some cases, the analog beamforming stage includes a phase shifter associated with each antenna of an antenna subarray. In some cases, the digital beamforming stage includes at least one of a transmission precoder, or a receiver combiner, or a combination thereof. Antenna port precoder manager 735 may identify, based on a co-phasing parameter associated with the two (or more) beamformed signals, an antenna port precoder configuration to use for communicating with the UE.

UE RS reception manager 740 may receive a UE RS from a UE. RS set transmission manager 745 may transmit a set of reference symbols to a UE, the set of reference symbols including at least two beamformed signals.

Co-phase indicator manager 750 may identify, based on the co-phasing indicator, an antenna port precoder configuration to use for communicating with the UE and determine, based on the co-phasing indicator, a beamforming direction associated with the UE.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
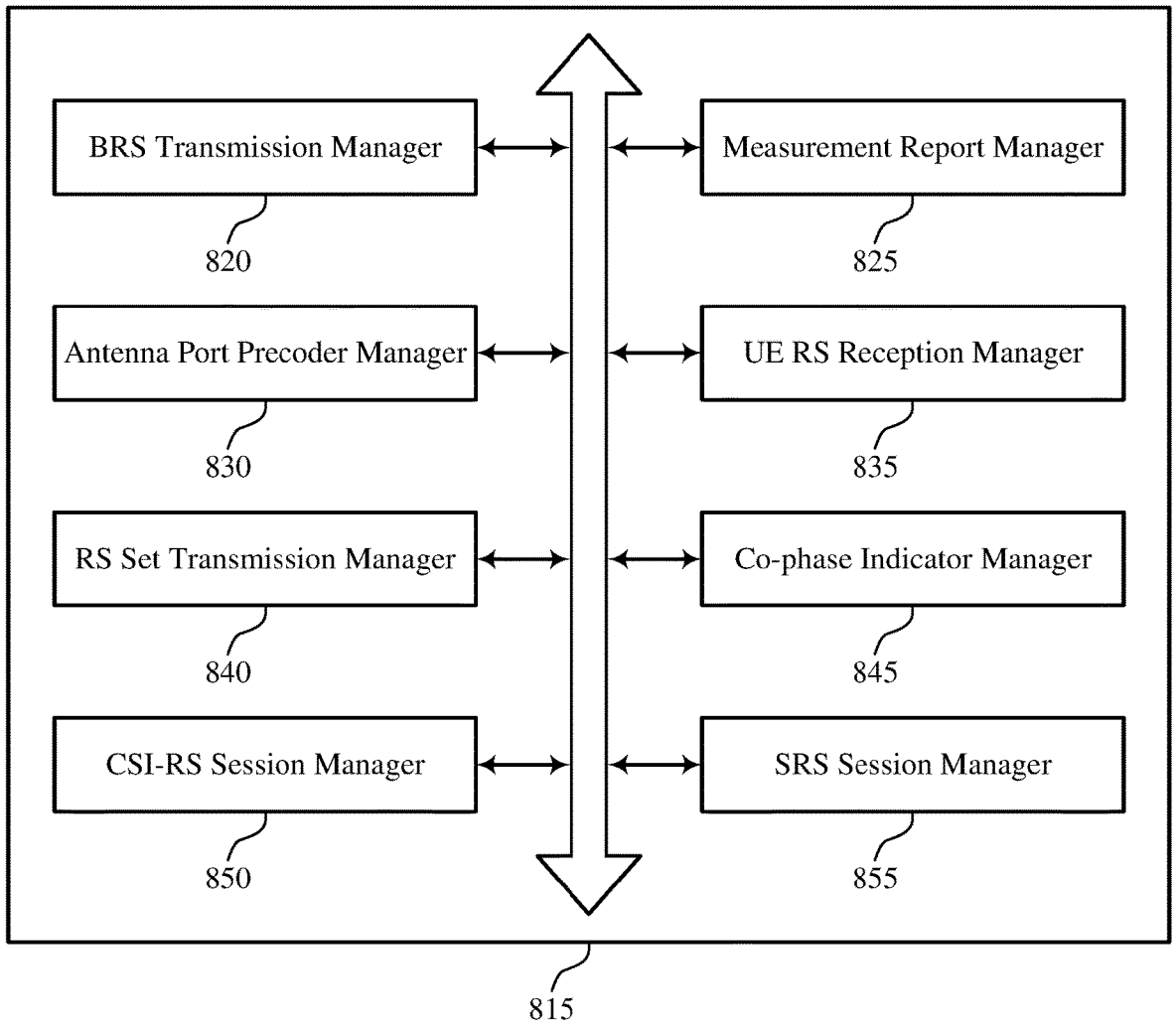

FIG. 8 shows a block diagram 800 of a RS session manager 815 that supports use of beam tracking results in reference symbol sessions, in accordance with one or more aspects of the present disclosure. The RS session manager 815 may be an example of aspects of a RS session manager 615, a RS session manager 715, or a RS session manager 915 described with reference to FIGS. 6, 7, and 9. The RS session manager 815 may include a BRS transmission manager 820, a measurement report manager 825, an antenna port precoder manager 830, a UE RS reception manager 835, a RS set transmission manager 840, a co-phase indicator manager 845, a CSI-RS session manager 850, and a SRS session manager 855. Each of these modules may communicate, directly or indirectly, with one another (e.g., via one or more buses).

BRS transmission manager 820 may transmit one or more beamformed signals to a UE, each beamformed signal associated with an antenna port precoder configuration and transmit a RS to the UE according to the identified antenna port precoder configuration. BRS transmission manager 820 may transmit a request message to a UE that includes a request for the UE to transmit a set of SRSs, the set of SRSs including two (or more) beamformed signals. BRS transmission manager 820 may receive the set of SRSs from the UE in accordance with the request message.

Measurement report manager 825 may receive, in response to the beamformed signals, a measurement report from the UE. Measurement report manager 825 may receive, based on the set of reference symbols, a measurement report from the UE, the measurement report including a co-phasing indicator associated with the set of reference symbols. Measurement report manager 825 may receive the measurement report that includes a co-phasing indicator associated with each set of reference symbols of the set of sets of reference symbols. In some cases, the measurement report includes information associated with at least one of a SNR, or a SINR, a RSRP, or a RSSI, a RSRQ, or combinations thereof.

Antenna port precoder manager 830 may identify, based on the measurement report, an antenna port precoder configuration to use during a RS session associated with the UE. Antenna port precoder manager 830 may adjust one or more of a digital beamforming stage, an analog beamforming stage, or combinations thereof, according to the identified antenna port precoder configuration. In some cases, the analog beamforming stage includes a phase shifter associated with each antenna of an antenna subarray. In some cases, the digital beamforming stage includes at least one of a transmission precoder, or a receiver combiner, or a combination thereof. Antenna port precoder manager 830 may identify, based on a co-phasing parameter associated with the two (or more) beamformed signals, an antenna port precoder configuration to use for communicating with the UE.

UE RS reception manager 835 may receive a UE RS from a UE. RS set transmission manager 840 may transmit a set of reference symbols to a UE, the set of reference symbols including at least two beamformed signals.

Co-phase indicator manager 845 may identify, based on the co-phasing indicator, an antenna port precoder configuration to use for communicating with the UE and determine, based on the co-phasing indicator, a beamforming direction associated with the UE.

CSI-RS session manager 850 may transmit one or more CSI-RSs to the UE according to the identified antenna port precoder configuration. CSI-RS session manager 850 may identify an interference metric associated with the RS session associated with the UE. CSI-RS session manager 850 may identify the antenna port precoder configuration based on the interference metric. In some cases, the RS session includes a CSI-RS session associated with the at least one UE. In some cases, the identified antenna port precoder configuration includes an angular separation distance between two or more CSI-RS transmissions.

SRS session manager 855 may transmit an indication of the identified antenna port precoder configuration to the UE and receive one or more SRS transmissions from the UE, the SRS transmission being transmitted according to the identified antenna port precoder configuration. In some cases, the RS session includes a SRS session associated with the at least one UE. In some cases, the UE RS includes SRSs.

Figure 9:
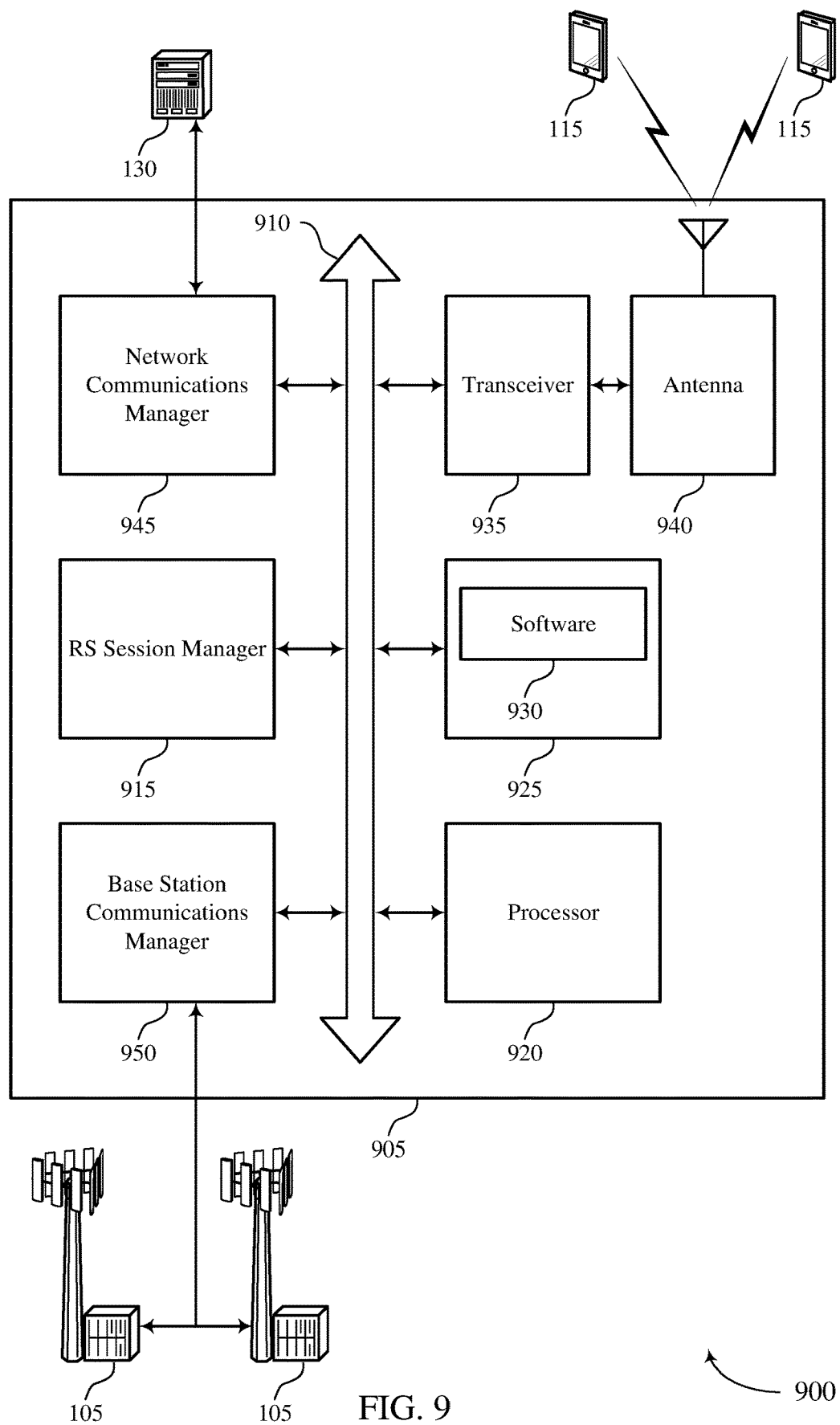
FIG. 9 illustrates a block diagram of a system including a base station that supports use of beam tracking results in reference symbol sessions, in accordance with one or more aspects of the present disclosure.

FIG. 9 shows a diagram of a system 900 including a device 905 that supports use of beam tracking results in reference symbol sessions, in accordance with one or more aspects of the present disclosure. Device 905 may be an example of or include the components of device 605, device 705, or a network device 105 as described above, e.g., with reference to FIGS. 1 through 7. Device 905 may include components for bi-directional voice and data communications including components for transmitting and receiving communications, including a RS session manager 915, a processor 920, a memory 925, a software 930, a transceiver 935, an antenna 940, a network communications manager 945, and a base station communications manager 950. These components may be in electronic communication via one or more busses (e.g., bus 910). Device 905 may communicate wirelessly with one or more UEs 115.

Processor 920 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting use of beam tracking results in reference symbol sessions).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support use of beam tracking results in reference symbol sessions. Software 930 may be stored in a non-transitory computer-readable medium such as system memory or other memory. In some cases, the software 930 may not be directly executable by the processor 920 but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network 130 (e.g., via one or more wired backhaul links). For example, the network communications manager 945 may manage the transfer of data communications for client devices, such as one or more UEs 115.

Base station communications manager 950 may manage communications with other base station 105, and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within an LTE/LTE-A wireless communication network technology to provide communication between base stations 105.

Figure 10:
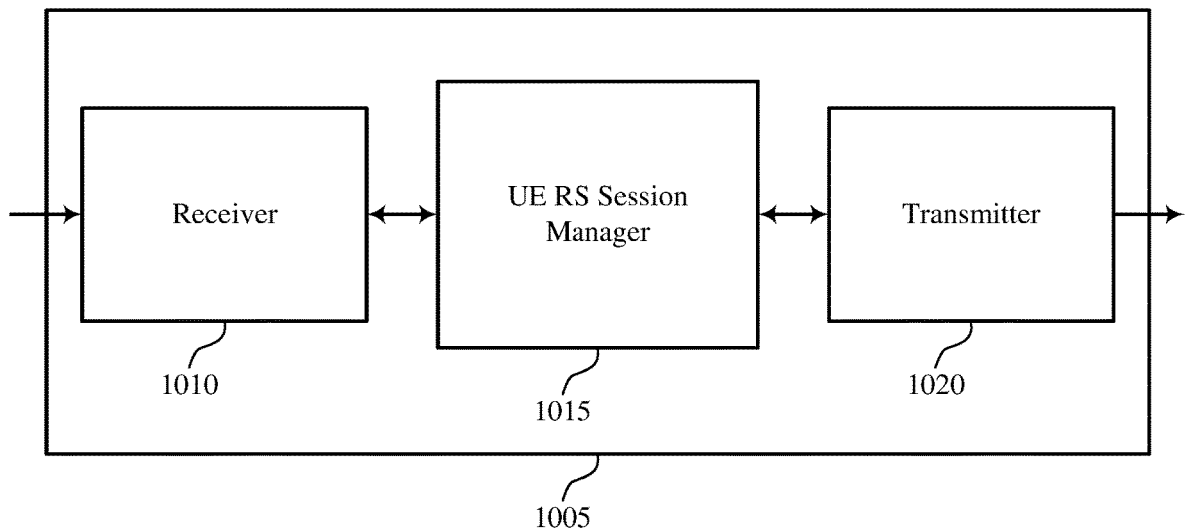
FIGS. 10 through 11 show block diagrams of a device that supports use of beam tracking results in reference symbol sessions, in accordance with one or more aspects of the present disclosure.

FIG. 10 shows a block diagram 1000 of a wireless device 1005 that supports use of beam tracking results in reference symbol sessions, in accordance with one or more aspects of the present disclosure. Wireless device 1005 may be an example of aspects of a UE 115 as described herein. Wireless device 1005 may include a receiver 1010, a UE RS session manager 1015, and a transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to use of beam tracking results in reference symbol sessions, etc.). Information may be passed on to other components of the device. The receiver 1010 may be an example of aspects of the transceiver 1235 described with reference to FIG. 12.

UE RS session manager 1015 may be an example of aspects of the UE RS session manager 1215 described with reference to FIG. 12.

UE RS session manager 1015 and/or at least some of its various sub-components may be implemented in hardware, software executed by a processor, firmware, or any combination thereof. If implemented in software executed by a processor, the functions of the UE RS session manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE RS session manager 1015 and/or at least some of its various sub-components may be physically located at various positions, including being distributed such that portions of functions are implemented at different physical locations by one or more physical devices. In some examples, UE RS session manager 1015 and/or at least some of its various sub-components may be a separate and distinct component in accordance with various aspects of the present disclosure. In other examples, UE RS session manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE RS session manager 1015 may receive a set of reference symbols from a base station, the set of reference symbols including at least two beamformed signals. UE RS session manager 1015 may identify, based on the at least two beamformed signals, a co-phasing indicator associated with the set of reference signals. UE RS session manager 1015 may transmit a measurement report to the base station, the measurement report including the co-phasing indicator associated with the set of reference symbols.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
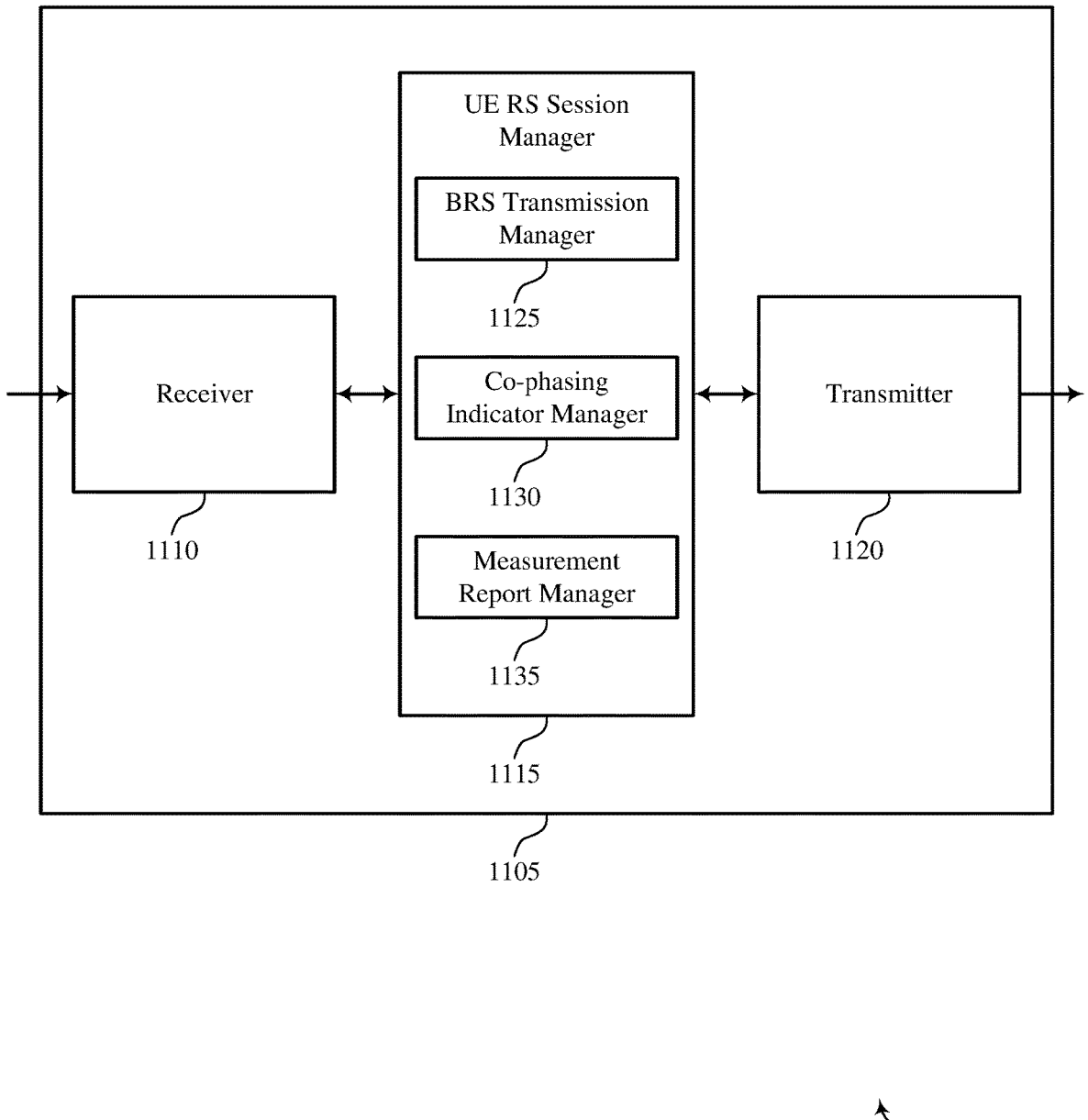

FIG. 11 shows a block diagram 1100 of a wireless device 1105 that supports use of beam tracking results in reference symbol sessions, in accordance with one or more aspects of the present disclosure. Wireless device 1105 may be an example of aspects of a wireless device 1005 or a UE 115 as described herein. Wireless device 1105 may include a receiver 1110, a UE RS session manager 1115, and a transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to use of beam tracking results in reference symbol sessions, etc.). Information may be passed on to other components of the device. The receiver 1110 may be an example of aspects of the transceiver 1235 described with reference to FIG. 12.

UE RS session manager 1115 may be an example of aspects of the UE RS session manager 1215 described with reference to FIG. 12. UE RS session manager 1115 may also include a BRS transmission manager 1125, a co-phasing indicator manager 1130, and a measurement report manager 1135.

BRS transmission manager 1125 may receive a set of reference symbols from a base station, the set of reference symbols including at least two beamformed signals. BRS transmission manager 1125 may receive a plurality of sets of reference symbols, each set of reference symbols including the at least two beamformed signals. BRS transmission manager 1125 may receive each of the beamformed signals of the at least two beamformed signals in either the same direction or in a different direction.

Co-phasing indicator manager 1130 may identify, based on the at least two beamformed signals, a co-phasing indicator associated with the set of reference signals. Co-phasing indicator manager 1130 may identify the co-phasing indicator associated with each set of reference symbols. In some cases, the co-phasing indicator includes at least one of an indication associated with a phase shift between the two beamformed signals of the set of reference signals, or an angle of arrival between the two beamformed signals of the set of reference signals, or combinations thereof.

Measurement report manager 1135 may transmit a measurement report to the base station, the measurement report including the co-phasing indicator associated with the set of reference symbols. Measurement report manager 1135 may transmit one or more measurement reports to the base station, each measurement report including a corresponding co-phasing indicator.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1235 described with reference to FIG. 12. The transmitter 1120 may include a single antenna, or it may include a set of antennas.

Figure 12:
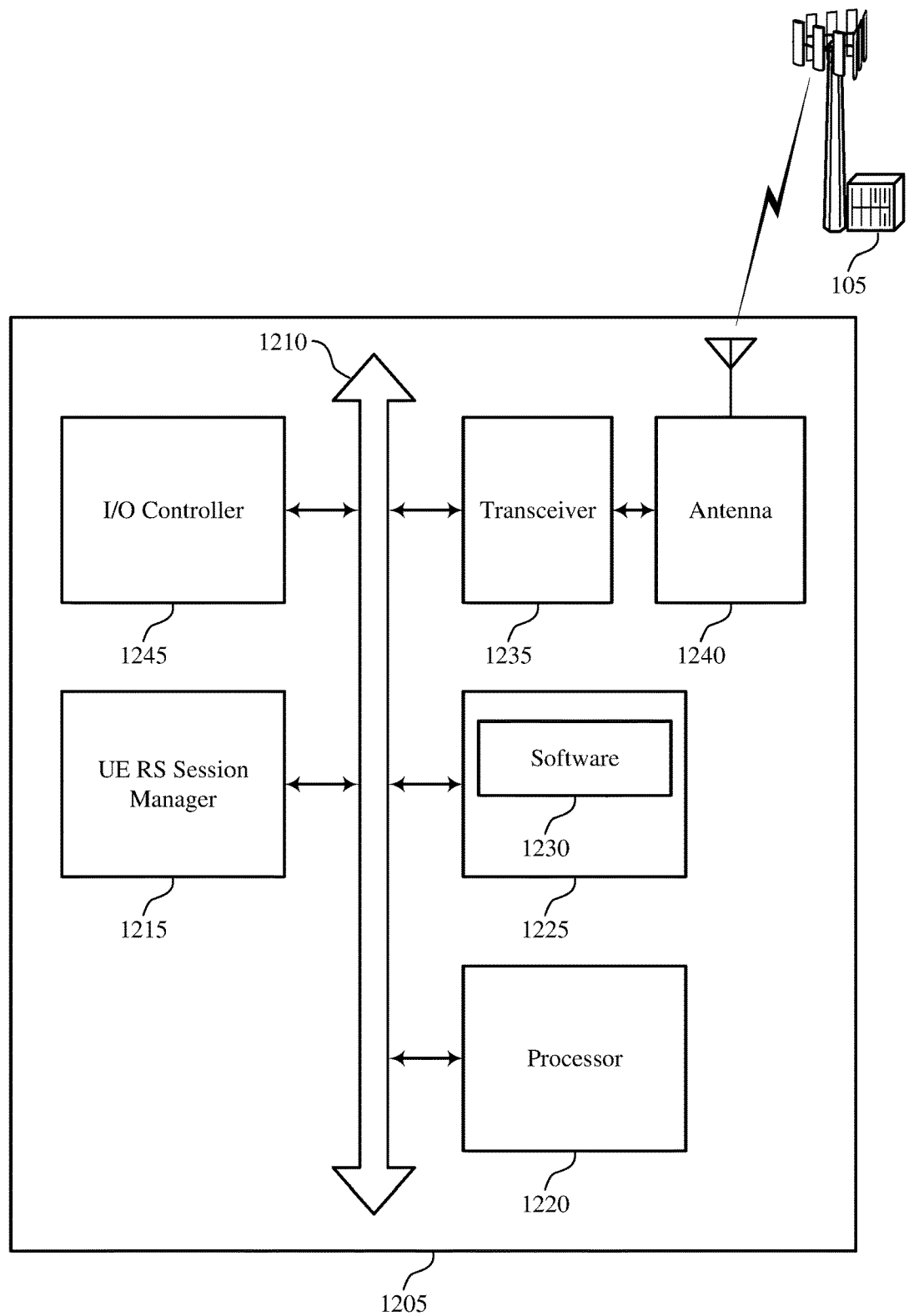
FIG. 12 illustrates a block diagram of a system including a user equipment that supports use of beam tracking results in reference symbol sessions, in accordance with one or more aspects of the present disclosure.

FIG. 12 shows a diagram of a system 1200 including a device 1205 that supports use of beam tracking results in reference symbol sessions, in accordance with one or more aspects of the present disclosure. Device 1205 may be an example of or include the components of UE 115 as described herein. Device 1205 may include components for bi-directional voice and data communications including components for transmitting and receiving communications, including a UE RS session manager 1215, a processor 1220, a memory 1225, a software 1230, a transceiver 1235, an antenna 1240, and an I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting use of beam tracking results in reference symbol sessions).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support use of beam tracking results in reference symbol sessions. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
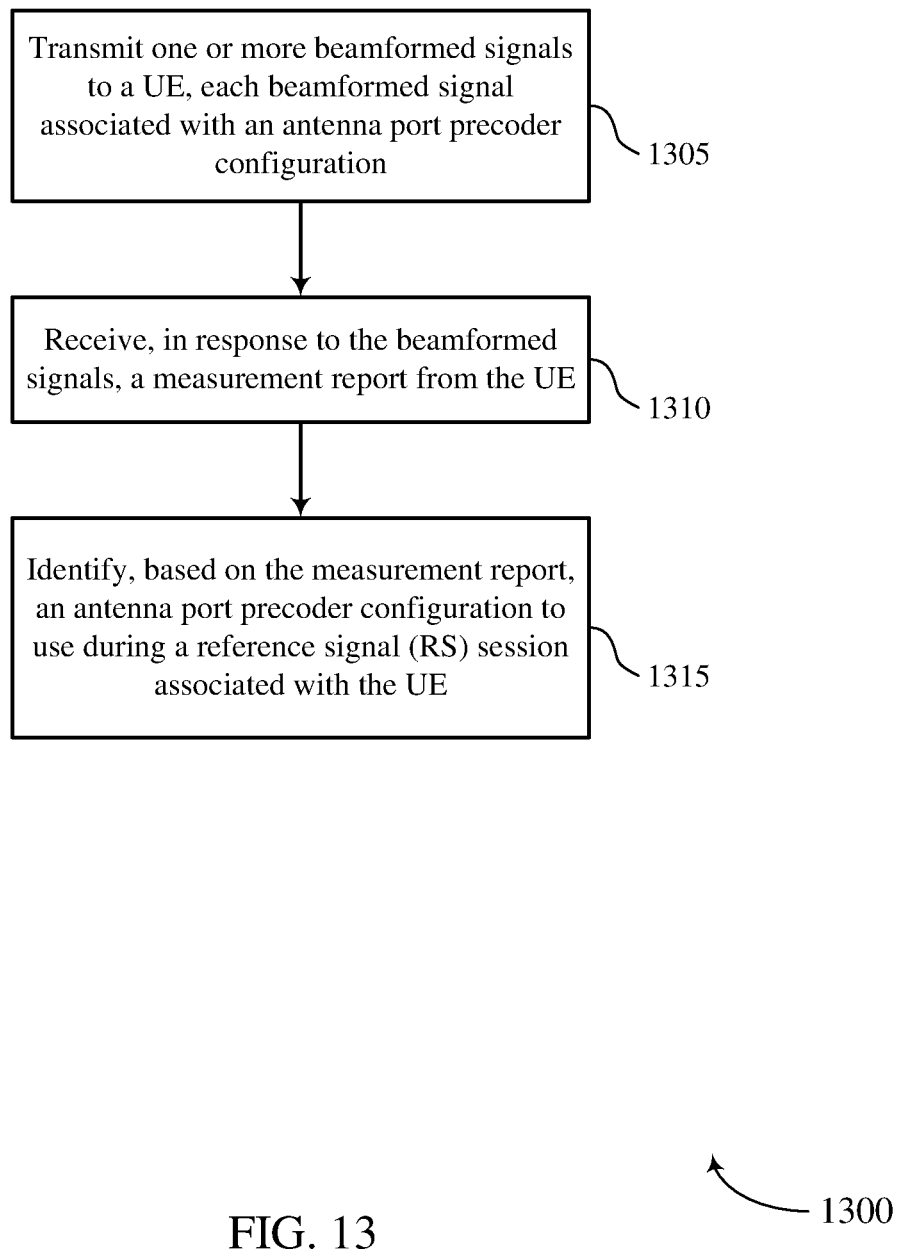
FIGS. 13 through 16 illustrate methods for use of beam tracking results, in accordance with one or more aspects of the present disclosure.

FIG. 13 shows a flowchart illustrating a method 1300 for use of beam tracking results in reference symbol sessions, in accordance with one or more aspects of the present disclosure. The operations of method 1300 may be implemented by a network device 105 or its components as described herein. For example, the operations of method 1300 may be performed by a RS session manager as described with reference to FIGS. 6 through 9. In some examples, a network device 105 may execute a set of codes to control the functional elements of the device to perform the functions described below. Additionally or alternatively, the network device 105 may perform aspects the functions described below using special-purpose hardware.

At block 1305 the network device 105 may transmit one or more beamformed signals to a UE, each beamformed signal associated with an antenna port precoder configuration. The operations of block 1305 may be performed according to the methods described with reference to FIGS. 1 through 5. In certain examples, aspects of the operations of block 1305 may be performed by a BRS transmission manager as described with reference to FIGS. 6 through 9.

At block 1310 the network device 105 may receive, in response to the beamformed signals, a measurement report from the UE. The operations of block 1310 may be performed according to the methods described with reference to FIGS. 1 through In certain examples, aspects of the operations of block 1310 may be performed by a measurement report manager as described with reference to FIGS. 6 through 9.

At block 1315 the network device 105 may identify, based at least in part on the measurement report, an antenna port precoder configuration to use during a RS session associated with the UE. The operations of block 1315 may be performed according to the methods described with reference to FIGS. 1 through 5. In certain examples, aspects of the operations of block 1315 may be performed by an antenna port precoder manager as described with reference to FIGS. 6 through 9.

Figure 14:
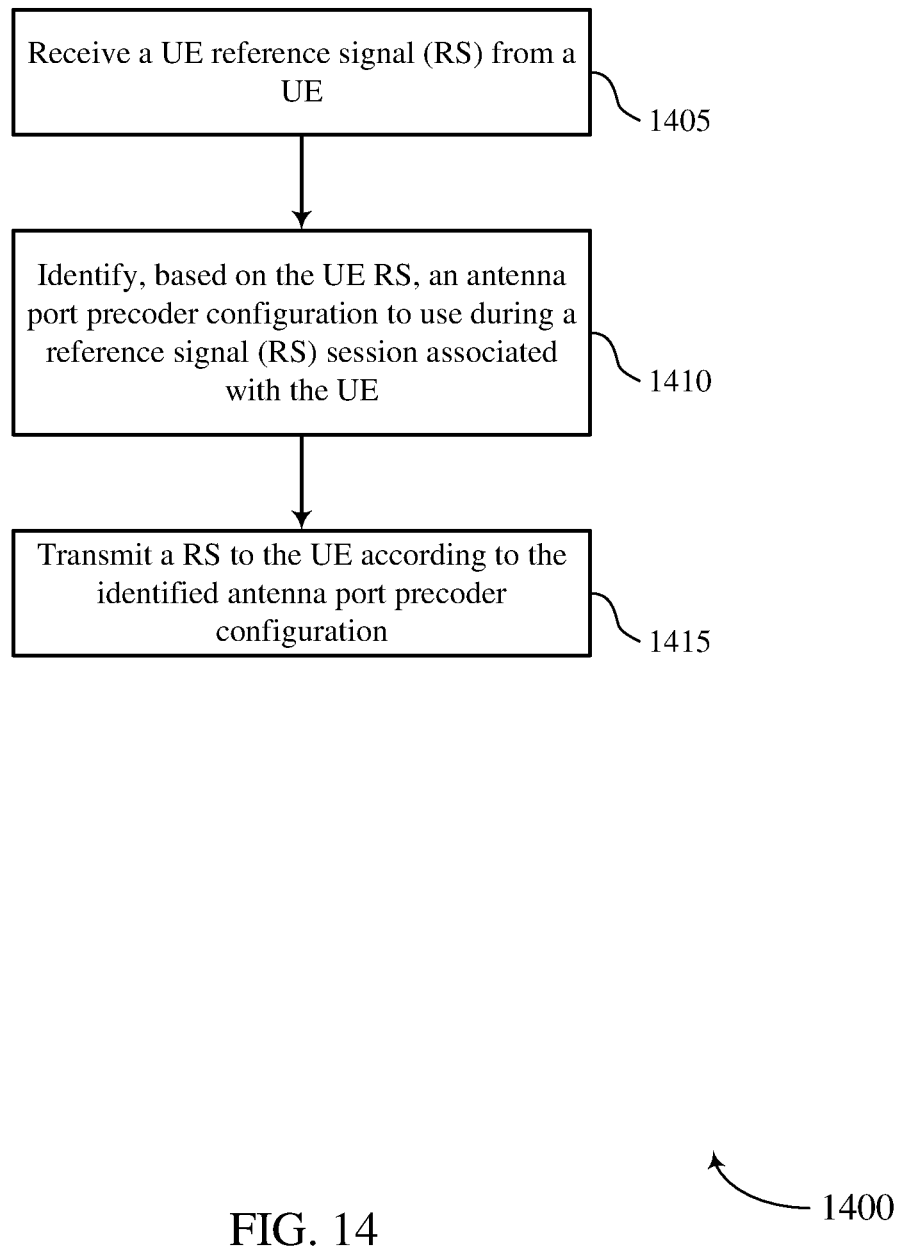

FIG. 14 shows a flowchart illustrating a method 1400 for use of beam tracking results in reference symbol sessions, in accordance with one or more aspects of the present disclosure. The operations of method 1400 may be implemented by a network device 105 or its components as described herein. For example, the operations of method 1400 may be performed by a RS session manager as described with reference to FIGS. 6 through 9. In some examples, a network device 105 may execute a set of codes to control the functional elements of the device to perform the functions described below. Additionally or alternatively, the network device 105 may perform aspects the functions described below using special-purpose hardware.

At block 1405 the network device 105 may receive a UE RS from a UE. The operations of block 1405 may be performed according to the methods described with reference to FIGS. 1 through 5. In certain examples, aspects of the operations of block 1405 may be performed by a UE RS reception manager as described with reference to FIGS. 6 through 9.

At block 1410 the network device 105 may identify, based at least in part on the UE RS, an antenna port precoder configuration to use during a RS session associated with the UE. The operations of block 1410 may be performed according to the methods described with reference to FIGS. 1 through 5. In certain examples, aspects of the operations of block 1410 may be performed by an antenna port precoder manager as described with reference to FIGS. 6 through 9.

At block 1415 the network device 105 may transmit a RS to the UE according to the identified antenna port precoder configuration. The operations of block 1415 may be performed according to the methods described with reference to FIGS. 1 through 5. In certain examples, aspects of the operations of block 1415 may be performed by a BRS transmission manager as described with reference to FIGS. 6 through 9.

Figure 15:
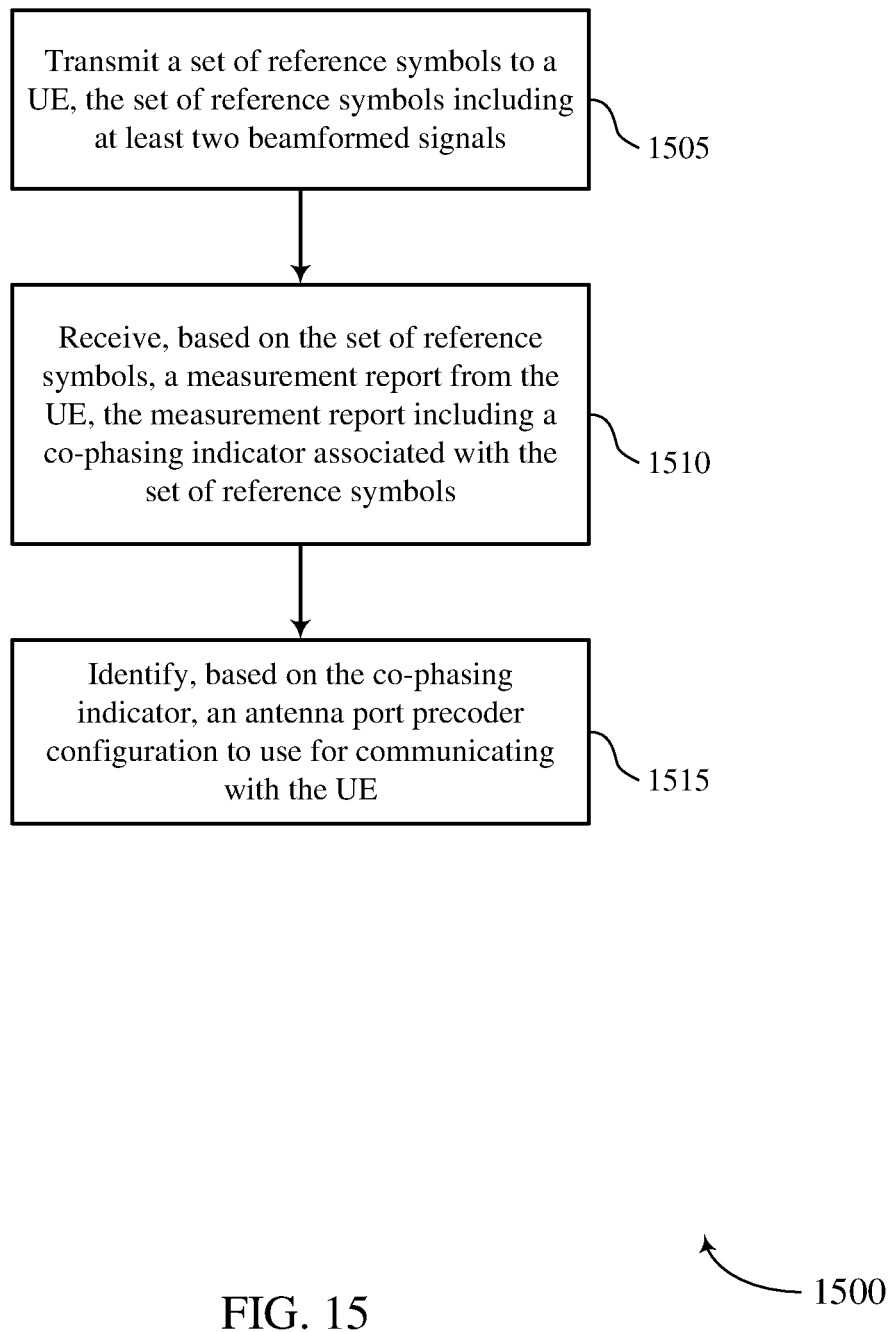

FIG. 15 shows a flowchart illustrating a method 1500 for use of beam tracking results in reference symbol sessions, in accordance with one or more aspects of the present disclosure. The operations of method 1500 may be implemented by a network device 105 or its components as described herein. For example, the operations of method 1500 may be performed by a RS session manager as described with reference to FIGS. 6 through 9. In some examples, a network device 105 may execute a set of codes to control the functional elements of the device to perform the functions described below. Additionally or alternatively, the network device 105 may perform aspects the functions described below using special-purpose hardware.

At block 1505 the network device 105 may transmit a set of reference symbols to a UE, the set of reference symbols comprising at least two beamformed signals. The operations of block 1505 may be performed according to the methods described with reference to FIGS. 1 through 5. In certain examples, aspects of the operations of block 1505 may be performed by a RS set transmission manager as described with reference to FIGS. 6 through 9.

At block 1510 the network device 105 may receive, based at least in part on the set of reference symbols, a measurement report from the UE, the measurement report comprising a co-phasing indicator associated with the set of reference symbols. The operations of block 1510 may be performed according to the methods described with reference to FIGS. 1 through 5. In certain examples, aspects of the operations of block 1510 may be performed by a measurement report manager as described with reference to FIGS. 6 through 9.

At block 1515 the network device 105 may identify, based at least in part on the co-phasing indicator, an antenna port precoder configuration to use for communicating with the UE. The operations of block 1515 may be performed according to the methods described with reference to FIGS. 1 through 5. In certain examples, aspects of the operations of block 1515 may be performed by a co-phase indicator manager as described with reference to FIGS. 6 through 9.

Figure 16:
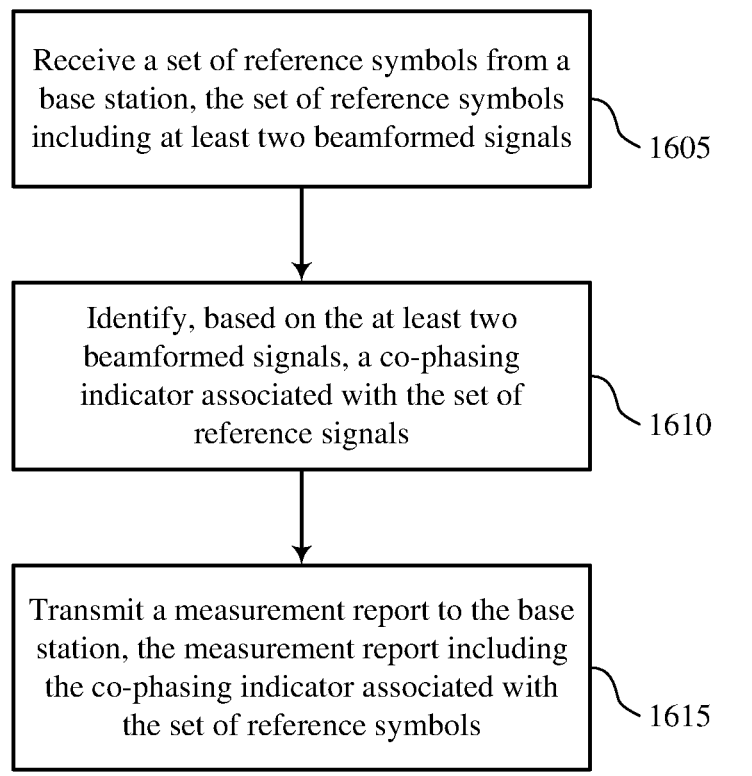

FIG. 16 shows a flowchart illustrating a method 1600 for use of beam tracking results in reference symbol sessions, in accordance with one or more aspects of the present disclosure. The operations of method 1600 may be implemented by a UE 115 or its components as described herein. For example, the operations of method 1600 may be performed by a UE RS session manager as described with reference to FIGS. 10 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a set of reference symbols from a base station, the set of reference symbols comprising at least two beamformed signals. The operations of block 1605 may be performed according to the methods described with reference to FIGS. 1 through 5. In certain examples, aspects of the operations of block 1605 may be performed by a BRS transmission manager as described with reference to FIGS. 10 through 12.

At block 1610 the UE 115 may identify, based at least in part on the at least two beamformed signals, a co-phasing indicator associated with the set of reference signals. The operations of block 1610 may be performed according to the methods described with reference to FIGS. 1 through 5. In certain examples, aspects of the operations of block 1610 may be performed by a co-phasing indicator manager as described with reference to FIGS. 10 through 12.

At block 1615 the UE 115 may transmit a measurement report to the base station, the measurement report comprising the co-phasing indicator associated with the set of reference symbols. The operations of block 1615 may be performed according to the methods described with reference to FIGS. 1 through 5. In certain examples, aspects of the operations of block 1615 may be performed by a measurement report manager as described with reference to FIGS. 10 through 12.

It should be noted that the methods described above describe possible implementations, and that the operations may be rearranged or otherwise modified and that other implementations are possible. Furthermore, aspects from two or more of the methods may be combined.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    transmitting a request to a user equipment (UE) for the UE to transmit a set of sounding reference signals (SRSs);
    receiving the set of SRSs in accordance with the request, the set of SRSs comprising at least two beamformed signals associated with a phase shift parameter;
    identifying, based at least in part on the phase shift parameter associated with the at least two beamformed signals, an antenna port precoder configuration; and
    transmitting an indication of the identified antenna port precoder configuration associated with the phase shift parameter to the UE for communication.

2. The method of claim 1, further comprising:
    determining, based at least in part on the phase shift parameter, a beamforming direction associated with the UE.

3. The method of claim 1, further comprising:
    adjusting at least one of a digital beamforming stage, or an analog beamforming stage, or combinations thereof, according to the identified antenna port precoder configuration.

4. The method of claim 3, wherein:
    the digital beamforming stage comprises at least one of a transmission precoder, or a receiver precoder, or combinations thereof.

5. The method of claim 3, wherein:
    the analog beamforming stage comprises a phase shifter associated with each antenna of an antenna subarray.

6. The method of claim 1, wherein the phase shift parameter comprises at least one of a phase shift between the at least two beamformed signals of the set of SRSs, or an angle of arrival between the at least two beamformed signals of the set of SRSs, or a combination thereof.

7. The method of claim 1, further comprising:
    communicating with the UE using one or more beamformed signals configured according to the identified antenna port precoder configuration.

8. The method of claim 1, further comprising:
    receiving additional sets of SRSs from the UE over a time period, each set of SRSs comprising at least two beamformed signals; and
    updating the identified antenna port precoder configuration based at least in part on the additional sets of SRSs from the UE.

9. The method of claim 1, further comprising:
    receiving a plurality of sets of SRSs, each set of SRSs of the plurality of sets of SRSs comprising the at least two beamformed signals.

10. An apparatus for wireless communication, comprising:
    one or more memories; and
    one or more processors coupled with the one or more memories, the one or more processors, individually or collectively, configured to cause the apparatus to:
        transmit a request to a user equipment (UE) for the UE to transmit a set of sounding reference signals (SRSs);
        receive the set of SRSs in accordance with the request, the set of SRSs comprising at least two beamformed signals associated with a phase shift parameter; and
        identify, based at least in part on the phase shift parameter associated with the at least two beamformed signals, an antenna port precoder configuration; and
        transmit an indication of the identified antenna port precoder configuration associated with the phase shift parameter to the UE for communication.

11. The apparatus of claim 10, wherein the one or more processors are further, individually or collectively, configured to cause the apparatus to:
    determine, based at least in part on the phase shift parameter, a beamforming direction associated with the UE.

12. The apparatus of claim 10, wherein the one or more processors are further, individually or collectively, configured to cause the apparatus to:
    adjust at least one of a digital beamforming stage, or an analog beamforming stage, or combinations thereof, according to the identified antenna port precoder configuration.

13. The apparatus of claim 12, wherein:
    the digital beamforming stage comprises at least one of a transmission precoder, or a receiver precoder, or combinations thereof.

14. The apparatus of claim 12, wherein:
    the analog beamforming stage comprises a phase shifter associated with each antenna of an antenna subarray.

15. The apparatus of claim 10, wherein the phase shift parameter comprises at least one of a phase shift between the at least two beamformed signals of the set of SRSs, or an angle of arrival between the at least two beamformed signals of the set of SRSs, or a combination thereof.

16. The apparatus of claim 10, wherein the one or more processors are further, individually or collectively, configured to cause the apparatus to:
communicate with the UE using one or more beamformed signals configured according to the identified antenna port precoder configuration.

17. The apparatus of claim 10, wherein the one or more processors are further, individually or collectively, configured to cause the apparatus to:
receive additional sets of SRSs from the UE over a time period, each set of SRSs comprising at least two beamformed signals; and
update the identified antenna port precoder configuration based at least in part on the additional sets of SRSs from the UE.

18. The apparatus of claim 10, wherein the one or more processors are, individually or collectively, configured to further cause the apparatus to:
receive a plurality of sets of SRSs, each set of SRSs of the plurality of sets of SRSs comprising the at least two beamformed signals.

19. A non-transitory computer-readable medium storing code for wireless communication by a network device, the code comprising instructions executable by one or more processors to cause the network device to:
transmit a request to a user equipment (UE) for the UE to transmit a set of sounding reference signals (SRSs);
receive the set of SRSs in accordance with the request, the set of SRSs comprising at least two beamformed signals associated with a phase shift parameter;
identify, based at least in part on the phase shift parameter associated with the at least two beamformed signals, an antenna port precoder configuration; and
transmit an indication of the identified antenna port precoder configuration associated with the phase shift parameter to the UE for communication.

20. The non-transitory computer-readable medium of claim 19, wherein the instructions are further executable by the one or more processors to cause the network device to:
determine, based at least in part on the phase shift parameter, a beamforming direction associated with the UE.

* * * * *